US011363325B2

(12) United States Patent
Knight et al.

(10) Patent No.: US 11,363,325 B2
(45) Date of Patent: Jun. 14, 2022

(54) AUGMENTED REALITY APPARATUS AND METHOD

(71) Applicant: 2MEE LTD, York (GB)

(72) Inventors: Christopher George Knight, York (GB); James Patrick Riley, York (GB); David Soppelsa, York (GB)

(73) Assignee: 2MEE LTD, York (GB)

( * ) Notice: Subject to any disclaimer, the term of this patent is extended or adjusted under 35 U.S.C. 154(b) by 0 days.

(21) Appl. No.: 16/864,655

(22) Filed: May 1, 2020

(65) Prior Publication Data

US 2020/0359079 A1 Nov. 12, 2020

Related U.S. Application Data

(63) Continuation of application No. 15/127,554, filed as application No. PCT/GB2015/050832 on Mar. 20, 2015, now Pat. No. 10,856,037.

(30) Foreign Application Priority Data

Mar. 20, 2014 (GB) ..................................... 1404990

(51) Int. Cl.
*H04N 21/43* (2011.01)
*H04N 1/32* (2006.01)
(Continued)

(52) U.S. Cl.
CPC ... *H04N 21/43072* (2020.08); *A63B 24/0003* (2013.01); *A63B 69/36* (2013.01);
(Continued)

(58) Field of Classification Search
CPC ......... H04N 21/4307; H04N 21/32101; H04N 21/32144; H04N 21/4126; H04N 21/4223;
(Continued)

(56) References Cited

U.S. PATENT DOCUMENTS

| 5,947,742 A | 9/1999 | Katayama |
| 5,984,684 A | 11/1999 | Brostedt et al. |

(Continued)

FOREIGN PATENT DOCUMENTS

| EP | 1349382 A2 | 10/2003 |
| EP | 2779633 A1 | 9/2014 |

(Continued)

OTHER PUBLICATIONS

Par2Pro: Swinguru at the PGA Expo 201 by Par2Pro, Aug. 22, 2013, XP054975880, Retrieved from internet: URL:https://www.youtube.com/watch?v=PmHSyDw0MQs, retrieved on Aug. 19, 2019, 1 page.

(Continued)

*Primary Examiner* — Jefferey F Harold
*Assistant Examiner* — Alexander Boyd
(74) *Attorney, Agent, or Firm* — Gesmer Updegrove LLP

(57) ABSTRACT

A live broadcast is depicted, in this case a golf tournament. The broadcast is depicted on a television screen of a user, substantially in real time. In a television studio, which may be close to the site of the live broadcast, or may be remote therefrom, a commentator or pundit records segments of video analysis. The video image is sent to a server. The video clip of the commentator is then downloadable by the user using a device such as a mobile phone or tablet. The user can then view the additional content—the video segment of the commentator—on his device. Using the techniques of positioning and anchoring as described herein, the user can enjoy the video segment as though the commentator were present in the room, by viewing the room through a camera of the device.

18 Claims, 20 Drawing Sheets

(51) Int. Cl.

| | | |
|---|---|---|
| *A63B 24/00* | (2006.01) | |
| *A63B 69/36* | (2006.01) | |
| *G06T 11/60* | (2006.01) | |
| *G09B 5/02* | (2006.01) | |
| *G09B 19/00* | (2006.01) | |
| *H04N 21/41* | (2011.01) | |
| *H04N 21/4223* | (2011.01) | |
| *H04N 21/431* | (2011.01) | |
| *H04N 21/433* | (2011.01) | |
| *H04N 21/81* | (2011.01) | |

(52) U.S. Cl.
CPC ............... *G06T 11/60* (2013.01); *G09B 5/02* (2013.01); *G09B 19/0038* (2013.01); *H04N 1/32101* (2013.01); *H04N 1/32144* (2013.01); *H04N 21/4126* (2013.01); *H04N 21/4223* (2013.01); *H04N 21/4316* (2013.01); *H04N 21/4334* (2013.01); *H04N 21/43079* (2020.08); *H04N 21/8133* (2013.01); *H04N 21/8146* (2013.01)

(58) Field of Classification Search
CPC ........... H04N 21/4316; H04N 21/4334; H04N 21/8133; H04N 21/8146; A63B 24/0003; A63B 69/36; G06T 11/60; G09B 5/02; G09B 19/0038
See application file for complete search history.

(56) References Cited

U.S. PATENT DOCUMENTS

| | | | |
|---|---|---|---|
| 10,885,333 | B2 | 1/2021 | Knight et al. |
| 2002/0115047 | A1 | 8/2002 | McNitt et al. |
| 2003/0108329 | A1 | 6/2003 | Adriansen et al. |
| 2005/0272517 | A1 | 12/2005 | Funk et al. |
| 2006/0038833 | A1 | 2/2006 | Mallinson et al. |
| 2006/0040755 | A1 | 2/2006 | Choi |
| 2006/0228689 | A1 | 10/2006 | Rajaram |
| 2007/0216675 | A1 | 9/2007 | Sun et al. |
| 2009/0319397 | A1 | 12/2009 | Joe et al. |
| 2010/0158109 | A1 | 6/2010 | Dahlby et al. |
| 2010/0309225 | A1 | 12/2010 | Gray et al. |
| 2011/0141254 | A1 | 6/2011 | Roebke et al. |
| 2011/0249073 | A1 | 10/2011 | Cranfill et al. |
| 2011/0275045 | A1 | 11/2011 | Bhupathi et al. |
| 2012/0200743 | A1 | 8/2012 | Blanchflower et al. |
| 2012/0206577 | A1 | 8/2012 | Guckenberger et al. |
| 2012/0250940 | A1 | 10/2012 | Kasahara |
| 2012/0274634 | A1 | 11/2012 | Yamada |
| 2012/0327172 | A1 | 12/2012 | El-Saban et al. |
| 2013/0050395 | A1 | 2/2013 | Paoletti et al. |
| 2013/0083173 | A1* | 4/2013 | Geisner .................. G09G 3/003 348/51 |
| 2013/0135295 | A1 | 5/2013 | Li et al. |
| 2014/0002677 | A1 | 1/2014 | Schinker |
| 2014/0308640 | A1 | 10/2014 | Forman et al. |
| 2014/0327677 | A1* | 11/2014 | Walker ............... H04N 21/4307 345/440 |
| 2015/0091891 | A1 | 4/2015 | Raheman et al. |
| 2015/0195626 | A1 | 7/2015 | Lee et al. |

FOREIGN PATENT DOCUMENTS

| | | |
|---|---|---|
| GB | 2462780 A | 2/2010 |
| GB | 2467280 A | 7/2010 |
| GB | 2508070 A | 5/2014 |
| JP | 2012216077 A | 11/2012 |
| KR | 1020120122512 A | 11/2012 |
| WO | 02069272 A2 | 9/2002 |
| WO | 2011067469 | 6/2011 |
| WO | 2012001218 | 1/2012 |
| WO | 2012061804 | 5/2012 |
| WO | 2012109182 | 8/2012 |
| WO | 2014041352 A1 | 3/2014 |
| WO | WO-2015185110 A1 * | 12/2015 ............... G06F 3/16 |

OTHER PUBLICATIONS

Li et al., Video Object Cut and Paste, Jul. 31, 2005, ACM, ACM SIGGRAPH 2005 Papers, (Year: 2005), 6 pages.
Search Report and Examination Opinion issued by the European Intellectual Property Office dated Jul. 21, 2015 in related Great Britain Application No. GB1504754.1.
International Search Report and Written Opinion issued by the International Searching Authority dated Sep. 28, 2015 in related International Application No. PCT/GB2015/051697, 10 pages.
International Preliminary Report on Patentability issued by the International Bureau of WIPO dated Dec. 15, 2016 in related International Application No. PCT/GB2015/051697, 8 pages.
International Preliminary Report on Patentability issued by the International Bureau of WIPO dated Sep. 20, 2016 in related International Application No. PCT/GB2015/050832, 6 pages.
International Search Report and Written Opinion issued by the International Searching Authority dated Jun. 15, 2015 in related International Application No. PCT/GB2015/050832, 8 pages.
International Preliminary Report on Patentability issued by the International Bureau of WIPO dated Mar. 17, 2015 in related International Application No. PCT/GB2013/052382, 5 pages.
International Search Report and Written Opinion issued by the International Searching Authority dated Jan. 15, 2014 in related International Application No. PCT/GB2013/052382, 8 pages.
Breiteneder et al., "TELEPORT—An Augmented Reality Teleconferencing Environment," Feb. 1996, Virtual Environments and Scientific Visualization '96, Proceedings of the Eurographics Workshops in Monte Carlo, Monaco, Springer, Vienna, pp. 41-49, year: 1996.
Lee et al., "Real-time Background Subtraction for Video Avatar," International Journal of Future Computer and Communication, vol. 2, No. 1, Feb. 2013, pp. 41-43.
Wilson et al., "Facial Feature Detection Using HAAR Classifiers," JCSC 21, 4, Apr. 2006, CCSC: South Central Conference, pp. 127-133.
Lin et al., "Implementation of a Realtime Object-Based Virtual Meeting System," 2001 IEEE International Conference on Multimedia and Expo, ISBN 0-7695-1198-8/01, pp. 565-568.
Search Report issued by the European Intellectual Property Office dated Jul. 20, 2015 in related Great Britain Application No. GB1502854.1.
Non-Final Office Action issued by the U.S. Patent and Trademark Office dated May 11, 2018, in related U.S. Appl. No. 15/127,554, 16 pages.
Final Office Action issued by the U.S. Patent and Trademark Office dated Feb. 19, 2019, in related U.S. Appl. No. 15/127,554, 20 pages.
Non-Final Office Action issued by the U.S. Patent and Trademark Office dated Sep. 6, 2019, in related U.S. Appl. No. 15/127,554, 15 pages.
Non-Final Office Action issued by the U.S. Patent and Trademark Office dated Dec. 12, 2017, in related U.S. Appl. No. 15/317,011, 21 pages.
Final Office Action issued by the U.S. Patent and Trademark Office dated Aug. 24, 2018 in related U.S. Appl. No. 15/317,011, 17 pages.
Non-Final Office Action issued by the U.S. Patent and Trademark Office dated Feb. 19, 2019, in related U.S. Appl. No. 15/317,011, 22 pages.
Final Office Action issued by the U.S. Patent and Trademark Office dated Oct. 4, 2019 in related U.S. Appl. No. 15/317,011, 20 pages.
Non-Final Office Action issued by the U.S. Patent and Trademark Office dated Aug. 23, 2017, in related U.S. Appl. No. 14/427,672, 20 pages.
Final Office Action issued by the U.S. Patent and Trademark Office dated Feb. 7, 2018, in related U.S. Appl. No. 14/427,672, 24 pages.
Final Office Action issued by the U.S. Patent and Trademark Office dated Jul. 25, 2018, in related U.S. Appl. No. 14/427,672, 25 pages.

(56) References Cited

OTHER PUBLICATIONS

Non-Final Office Action issued by the U.S. Patent and Trademark Office dated Jan. 28, 2019, in related U.S. Appl. No. 14/427,672, 31 pages.
Final Office Action issued by the U.S. Patent and Trademark Office dated Aug. 21, 2019, in related U.S. Appl. No. 14/427,672, 33 pages.
Non-Final Office Action issued by the U.S. Patent and Trademark Office dated Feb. 25, 2020, in related U.S. Appl. No. 14/427,672, 40 pages.
Non-Final Office Action issued by the U.S. Patent and Trademark Office in related U.S. Appl. No. 17/117,891 dated Aug. 2, 2021, 49 pages.

* cited by examiner

AUGMENTED REALITY APPARATUS AND METHOD

PRIORITY

The present application is a continuation of U.S. patent application Ser. No. 15/127,554, filed Sep. 20, 2016, which is a 371 National Phase Application of and claims priority to International Application No. PCT/GB2015/050832, filed Mar. 20, 2015, which claims priority to United Kingdom (UK) Patent Application No. 1404990.2, filed Mar. 20, 2014, the disclosures of which are herein incorporated by reference in their entireties.

BACKGROUND

The present invention relates to an apparatus and a method for providing an augmented reality experience, and is concerned particularly with an apparatus and a method for providing an augmented reality experience in a hand held device having a camera.

Augmented reality, in which the viewing of a real world environment is enhanced using computer generated input, is becoming available on various platforms, including television, head up displays, and to a limited extent, hand held devices such as cell phones and tablets.

The use of hand held devices, such as cell phones, as cameras has been enhanced by the availability of small, specialised downloadable programs, known informally as apps. Many of these include computer generated visual effects that can be combined with a "live view" through the camera, to provide the user with a degree of augmented reality for an improved image or amusement. However the incorporation of video footage into the live view of a camera has proved to be difficult due to the limited processing power available in most hand held devices, and the lack of a functional codebase provided with the built-in frameworks.

SUMMARY

Embodiments of the present invention aim to provide apparatus and a method for incorporating an apparently moving image into a live camera view of a hand held device.

The present invention is defined in the attached independent claims to which reference should now be made. Further, preferred features may be found in the sub-claims appended thereto.

According to one aspect of the present invention there is provided a method of teaching, coaching or demonstrating a task or action to a student, the method comprising recording an image of the student performing the task or action on a device having a camera, displaying on the device an image of an exemplary demonstration of the task or action as performed by a tutor, synchronising the image of the student with the image of the demonstration, and performing a comparative analysis of the two images.

In a preferred arrangement the exemplary demonstration is a moving video image, which may be a virtual image.

Preferably the method includes positioning and/or sizing the exemplary demonstration image with respect to the recorded image of the student. The method may also include anchoring the exemplary demonstration image with respect to a context in the recorded image of the student.

The method preferably includes selecting one or more reference points on the recorded image of the student to correspond with reference points in the exemplary image. The selecting of the one or more reference points may be made automatically.

In a preferred arrangement the analysis comprises a comparison of the reference points. The method may include providing a recommendation to improve the student's performance of the task or action, based upon the comparative analysis.

The method may include downloading the exemplary demonstration image. In a preferred arrangement the method comprises downloading the exemplary demonstration image and/or a tutor/commentator image in response to a broadcast. The download may be arranged to take place automatically in response to a broadcast.

In a preferred arrangement the method comprises identifying a context by comparing at least one object in the field of view with stored data from a plurality of objects. The method preferably comprises selecting an exemplary image from a plurality of stored images according to determined context information. The method also preferably comprises positioning the exemplary/virtual image according to context information determined by the context identification unit.

According to another aspect of the present invention there is provided apparatus for teaching, coaching or demonstrating a task or action to a student, the apparatus comprising a device having a camera for capturing an image of the student performing the task or action, context identification unit for identifying a context from the image captured by the device, a virtual image retrieval unit for selecting and displaying a virtual image comprising an exemplary demonstration of the task or action being performed by a tutor, and a virtual image positioning unit for positioning the virtual image in the display, wherein the apparatus is arranged to display the two images on the device, synchronise the image of the student with the image of the demonstration, and perform a comparative analysis of the two images.

Preferably the virtual image is one that has been previously stored.

The apparatus may be arranged in use to download the exemplary demonstration image. The apparatus may be arranged in use to download the exemplary demonstration image and/or a tutor/commentator image in response to a broadcast. The apparatus may be arranged to download automatically in response to a broadcast.

In a preferred arrangement the virtual image comprises a sequence of still images taken from a moving video.

Alternatively or additionally the virtual image may comprise a continuous moving video image.

The virtual image may comprise an image of a person or creature, or could be any other "real world" object or item.

In a preferred arrangement the context identification unit is arranged in use to identify a context by comparing at least one object in a field of view with stored data from a plurality of objects. The image retrieval unit is preferably arranged to select an image from a plurality of stored images according to context information determined by the context identification unit. The positioning unit is preferably arranged in use to position the virtual image according to context information determined by the context identification unit.

The positioning of the image by the positioning unit may include sizing of the image in the display, and may include anchoring the image in the display, with respect to context information determined by the context identification unit.

The context identification unit, and/or the virtual image retrieval unit, and/or the virtual image positioning unit may comprise processes arranged in use to be performed by one or more electronic processing devices.

In a preferred arrangement, the virtual image comprises a sequence of still images taken from a moving video.

The invention also comprises a program for causing a device to perform a method of teaching, coaching or demonstrating a task or action to a student, the method comprising recording an image of the student performing the task or action on a device having a camera, displaying on the device an image of an exemplary demonstration of the task or action as performed by a tutor, synchronising the image of the student with the image of the demonstration, and performing a comparative analysis of the two images.

The program may be contained within an app. The app may also contain data, such as virtual image data.

The virtual/exemplary image may comprise a sequence of still images taken from a moving video or else may comprise a moving video image.

The invention also comprises a computer program product, storing, carrying or transmitting thereon or therethrough a program for causing a device to perform a method of teaching, coaching or demonstrating a task or action to a student, the method comprising recording an image of the student performing the task or action on a device having a camera, displaying on the device an image of an exemplary demonstration of the task or action as performed by a tutor, synchronising the image of the student with the image of the demonstration, and performing a comparative analysis of the two images.

According to another aspect there is provided a method of delivering augmented content for a broadcast medium, the method comprising providing an additional viewable content image to a user device, for viewing on a display of the user device, identifying a context from a background image and positioning and anchoring the additional viewable content image within the display.

The method preferably includes capturing the background image on a camera of the user device.

The additional viewable content image may comprise a moving video image.

The image captured by the camera may be a live background image captured substantially in real time as the additional viewable content is viewed. Alternatively, or in addition, the method may include recording a background image captured by the camera and viewing the additional content image with the pre-recorded background image as a background. The background image may comprise a still image. Alternatively or in addition the background image may comprise a moving image.

The broadcast medium may comprise a television. The broadcast medium may display a sign that is recognisable by the user device, and the user device may be arranged to display the additional content upon recognition of the sign. The sign may comprise a visual sign and/or an audio sign. If the sign comprises an audio sign it may comprise an audio signal that is substantially inaudible to a viewer of the broadcast. The sign may be detectable by an app stored on the user device.

The sign, or a part thereof, may serve as a signal for the synchronisation of the additional viewable content with the broadcast.

The additional content may be pre-recorded in advance of the broadcast. Alternatively or in addition the additional viewable content may comprise a recording made during the broadcast for substantially immediate viewing. Alternatively or in addition the additional content may comprise an image delivered substantially contemporaneously with the broadcast.

The method may include accessing the additional content by interacting with the broadcast medium.

The additional content may be downloadable to the user device over the internet, and may be streamed to the user device. The additional content is preferably linked to the broadcast content, and may be linked temporally. The additional content may be provided in synchronisation with the broadcast content and may be synchronised to appear to the user in real time.

The invention also comprises a program for causing a device to perform a method of displaying augmented viewable content for a broadcast medium, the method comprising providing additional viewable content in the form of an additional viewable content image to a user device, for viewing on a display of the user device, identifying a context from a background image and positioning and anchoring the image within the display.

The invention also comprises a computer program product, storing, carrying or transmitting thereon or therethrough a program for causing a device to perform a method of displaying augmented viewable content for a broadcast medium, the method comprising providing additional viewable content in the form of an additional viewable content image to a user device, for viewing on a display of the user device, identifying a context from a background image and positioning and anchoring the image within the display.

The invention also includes apparatus for displaying augmented viewable content for a broadcast medium, the apparatus comprising a user device, a display, a context identification unit for identifying a context from a background image, a retrieval unit for selecting and displaying an additional viewable content image and a positioning unit for positioning the additional viewable content image in the display, wherein the apparatus is arranged to display additional viewable content to supplement a broadcast medium.

The apparatus may include a camera. The background image may comprise an image captured by the camera.

Preferably the additional viewable content image comprises a moving video image.

The camera may be arranged in use to capture a live background image substantially in real time as the additional viewable content is viewed. Alternatively, or in addition, the camera may be arranged to capture and record a background image for subsequent viewing of the content with the pre-recorded image as a background. The background image may comprise a still image. Alternatively or in addition the background image may comprise a moving image.

The user device may be arranged to display the additional content upon recognition of a sign from the broadcast.

The sign may take any of a number of forms, such as but not limited to: a visual sign and/or an audio sign. If the sign comprises an audio sign it may comprise an audio signal that is substantially inaudible to a viewer of the broadcast. The sign may be detectable by an app stored on the user device.

The sign, or a part thereof, may serve as a signal for the synchronisation of the additional viewable content with the broadcast.

The additional content may be pre-recorded in advance of the broadcast. Alternatively or in addition the additional viewable content may comprise a recording made during the broadcast for substantially immediate viewing. Alternatively or in addition the additional content may comprise an image delivered substantially contemporaneously with the broadcast.

The user device may be arranged in use to display a live background image when the device is in a first orientation. The user device may be arranged in use to display a pre-recorded background image when the device is in a second orientation. The device may be arranged in use to switch between the live and the pre-recorded background images. The device may be arranged to switch between the live and re-recorded background images according to a user action. Alternatively or additionally the user device may be arranged to switch automatically between a live background and a pre-recorded background image when the orientation of the device changes.

The additional viewable content may comprise a commercial message and/or image.

The app may be arranged to request feedback from the user in response to the additional content.

In a preferred arrangement the app is arranged to provide the user with an opportunity to interact with a social media platform in response to the additional content. The additional content may be linked to the social media platform.

The present invention may comprise any combination of the features or limitations referred to herein, except such a combination of features as are mutually exclusive.

BRIEF DESCRIPTION OF THE DRAWINGS

Preferred embodiments of the present invention will now be described by way of example only with reference to the accompanying diagrammatic drawings in which.

DETAILED DESCRIPTION

The embodiment described below aims to provide an augmented reality experience to a user of a hand held device, such as a mobile phone, which incorporates an electronic processor, a camera and a display. In particular, images taken from video footage are displayed in a display of a hand held device together with a live camera view, or in some cases a pre-recorded camera view, as a background, to create the illusion that the subject of the video—ie the virtual moving image—is present in the field of view of the camera in real time.

In this context the term "real world" image means an image taken from reality, such as a physical, real-world scenario using an electronic photo-capture technique, e.g. video recording.

In order to achieve this the device must undertake various processes, including acquiring contextual information from the camera view, obtaining an appropriate virtual image, positioning the virtual image within the camera view, optionally anchoring the virtual image with respect to the context and optionally sizing the virtual image within the camera view.

The processes may be performed by an electronic processor of the hand held device.

The data necessary for the reconstruction of the virtual moving image, together with one or more programs for facilitating the necessary processes for manipulating it to provide the augmented reality experience, are downloadable to a hand held device in the form of a specialist program, or software application, known widely as an app. The app can preferably be updated to present the user with fresh viewing experiences.

The first example described in detail below is that of an augmented reality system for use as a guide at a visitor attraction, in which a virtual image of a figure is displayed within the real world camera view to provide information, via an associated audio file, about the attraction.

Figure 1:
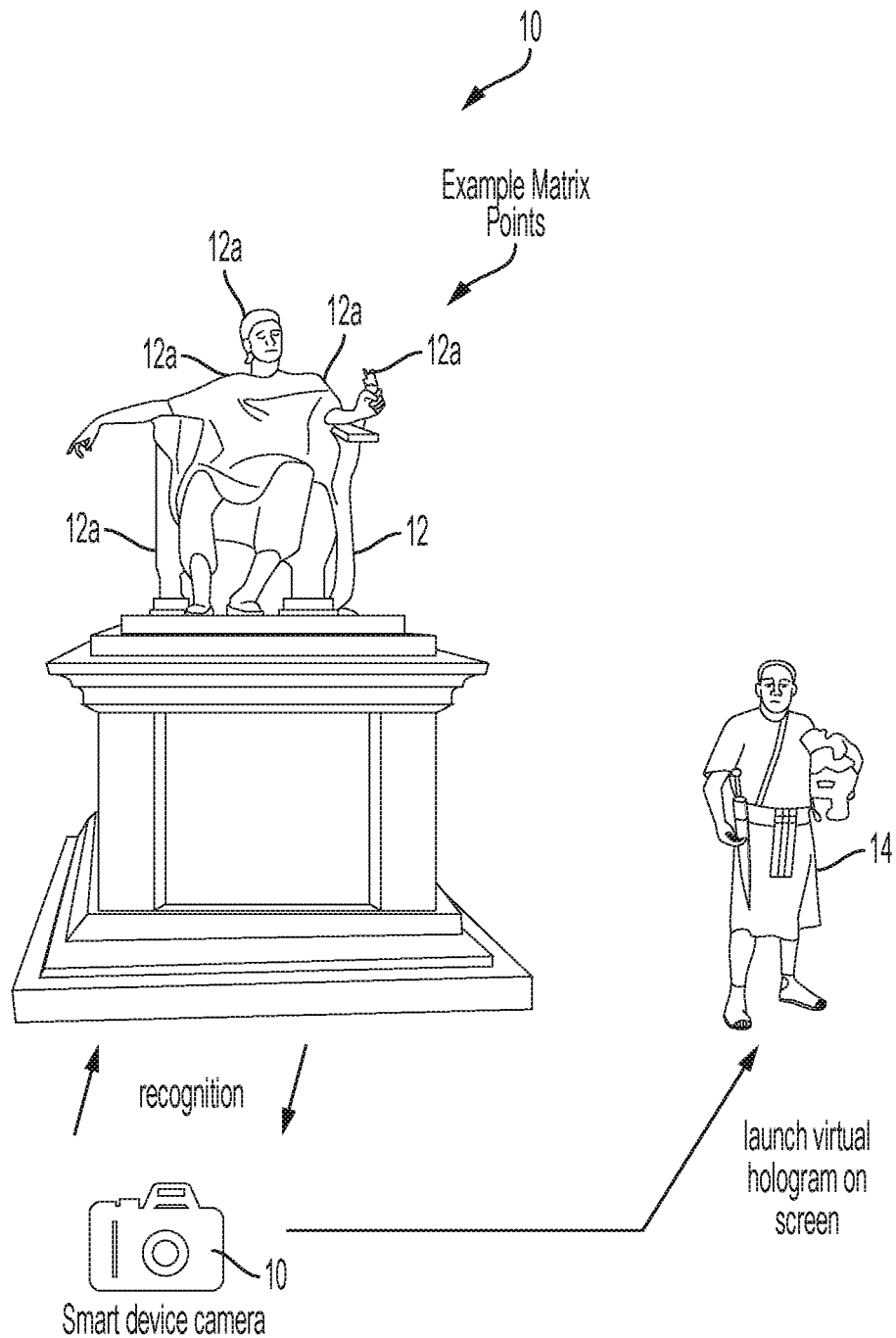
FIG. 1 shows a virtual image superimposed upon a camera view of a real image.

Turning to FIG. 1, this shows schematically a camera 10 of a hand held device, in this case aimed at a well-known object 12, which is recognisable to the device, and a moving virtual image 14 of an actor playing the part of an historical figure that is chosen because of its relevance to the object 12. The device recognises the object, in this case a statue, based upon a unique set of matrix points 12a which have been stored in the downloaded app in an earlier stage, and which can provide the device with contextual information necessary for the subsequent selection, display and manipulation of the virtual image 14.

Moving virtual images 14 are stored in the device as sequences of still images taken from a video file, and synchronised with an appropriate audio file, when the app is downloaded and the appropriate one is chosen after the context has been determined.

Figure 2:
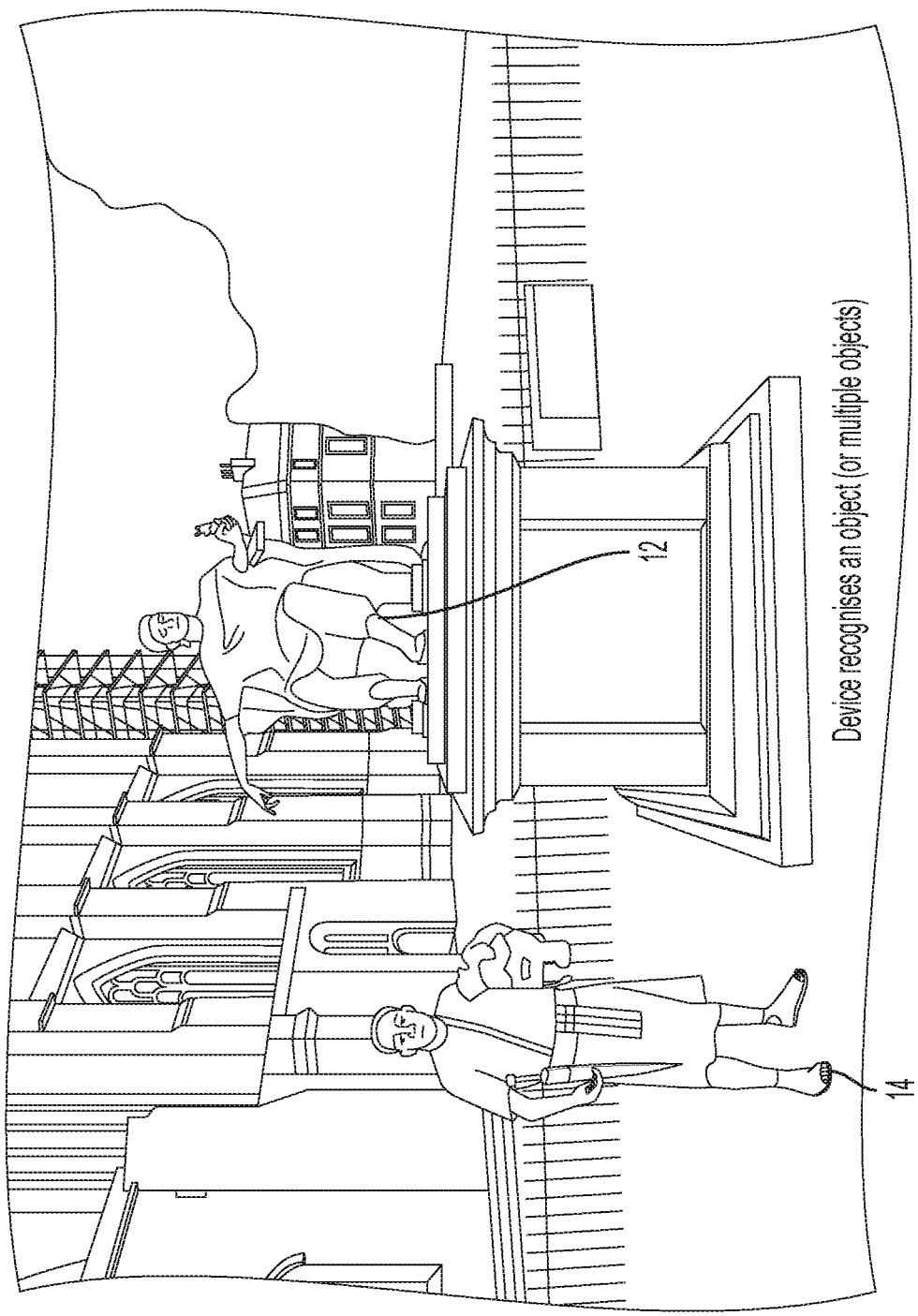
FIG. 2 shows schematically a first step in a context recognition.

Turning to FIG. 2, this shows the chosen virtual image 14 as it is displayed in the camera view of the device, beside the object 12.

Figure 3:
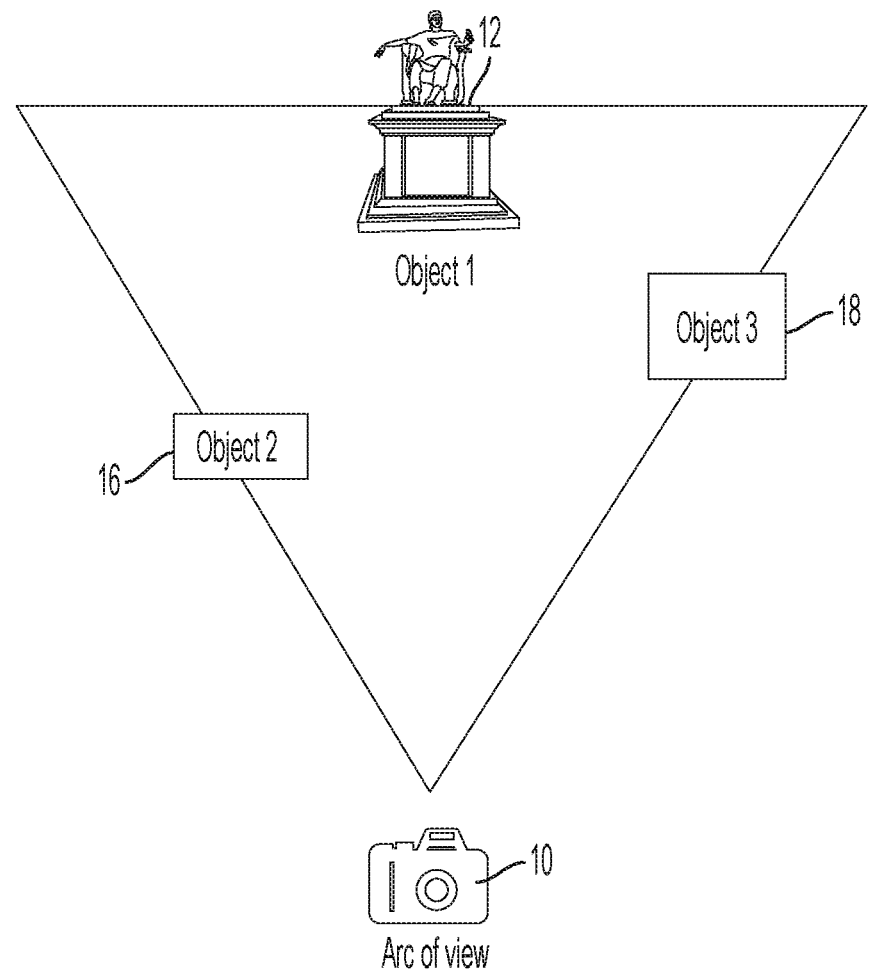
FIGS. 3 and 3a show schematically an alternative first step in a context recognition process, in which there are multiple visible objects in the camera live view.

FIG. 3 shows schematically the scenario in which multiple objects are detected by the device. In this case the object 12 is detected and so are two further objects 16 and

Figure 3A:
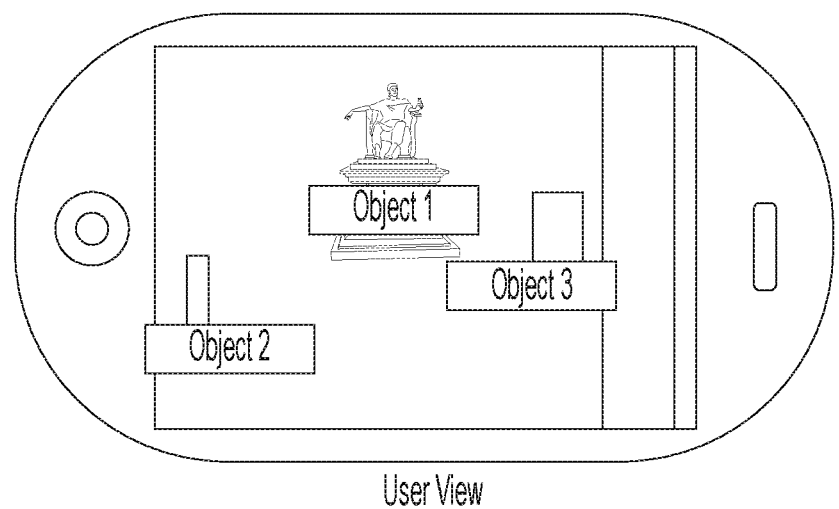

18. The device displays all three objects together with respective virtual buttons superimposed thereon so that the user may select the object of interest by touching the appropriate button on the screen, as is shown in FIG. 3a.

Figure 4:
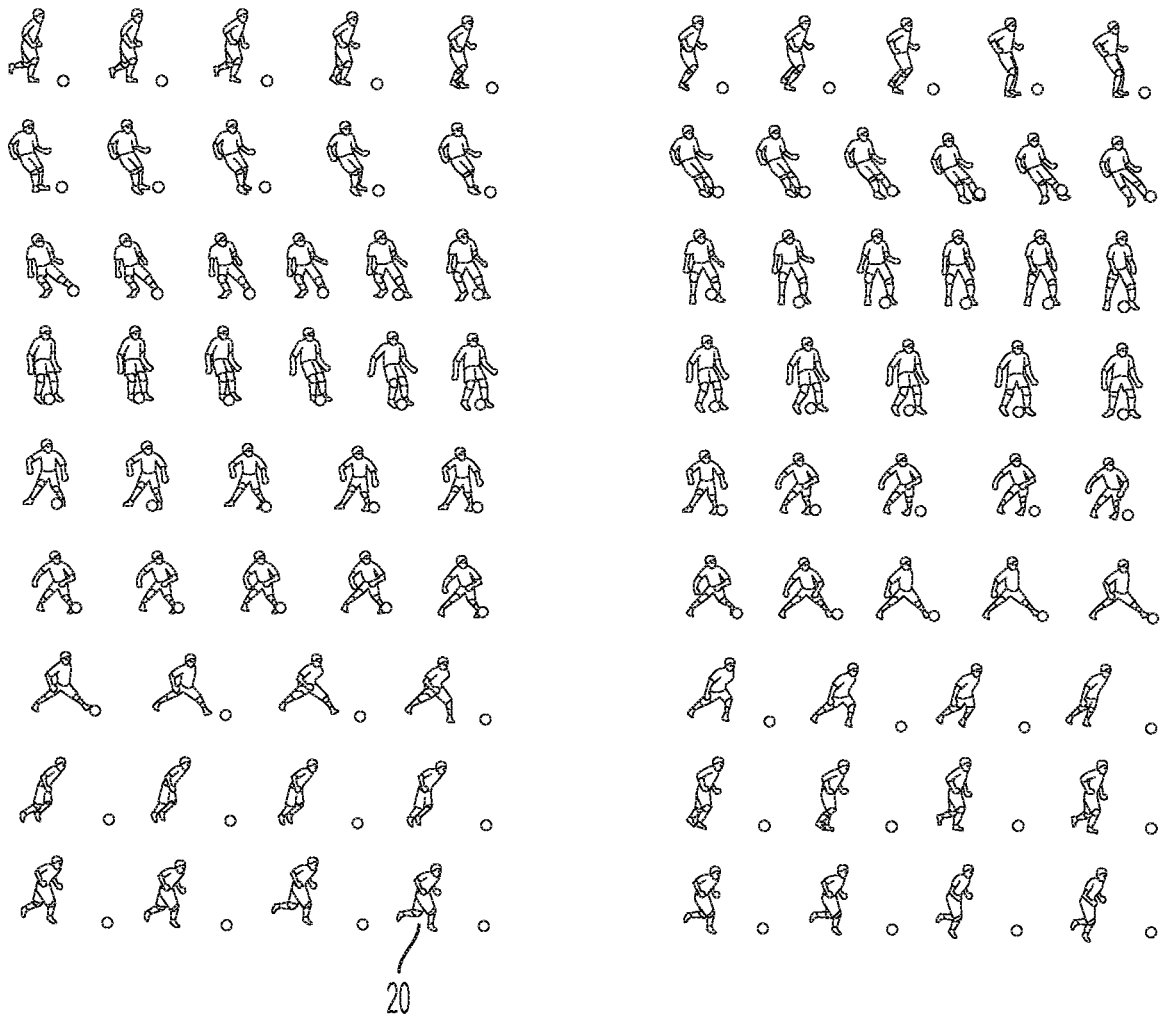
FIG. 4 shows schematically an animation.

FIG. 4 shows schematically one method for animating a virtual image. It uses a long established technique of cutting a moving image into a succession of still frames 20 on a green screen background (not shown). The device then plays back the sequence of still images, removing the green screen background automatically as necessary. As the individual images are replaced at a rate greater than six frames per second, the human eye interprets them as a continuous moving image. A soundtrack, optionally of MP3 format, is played in synchronism with the animation to reinforce the illusion of continuous video footage. In this example the animated figure is a Roman soldier, whose commentary and actions are relevant to the attraction being viewed through the camera display.

Figure 5:
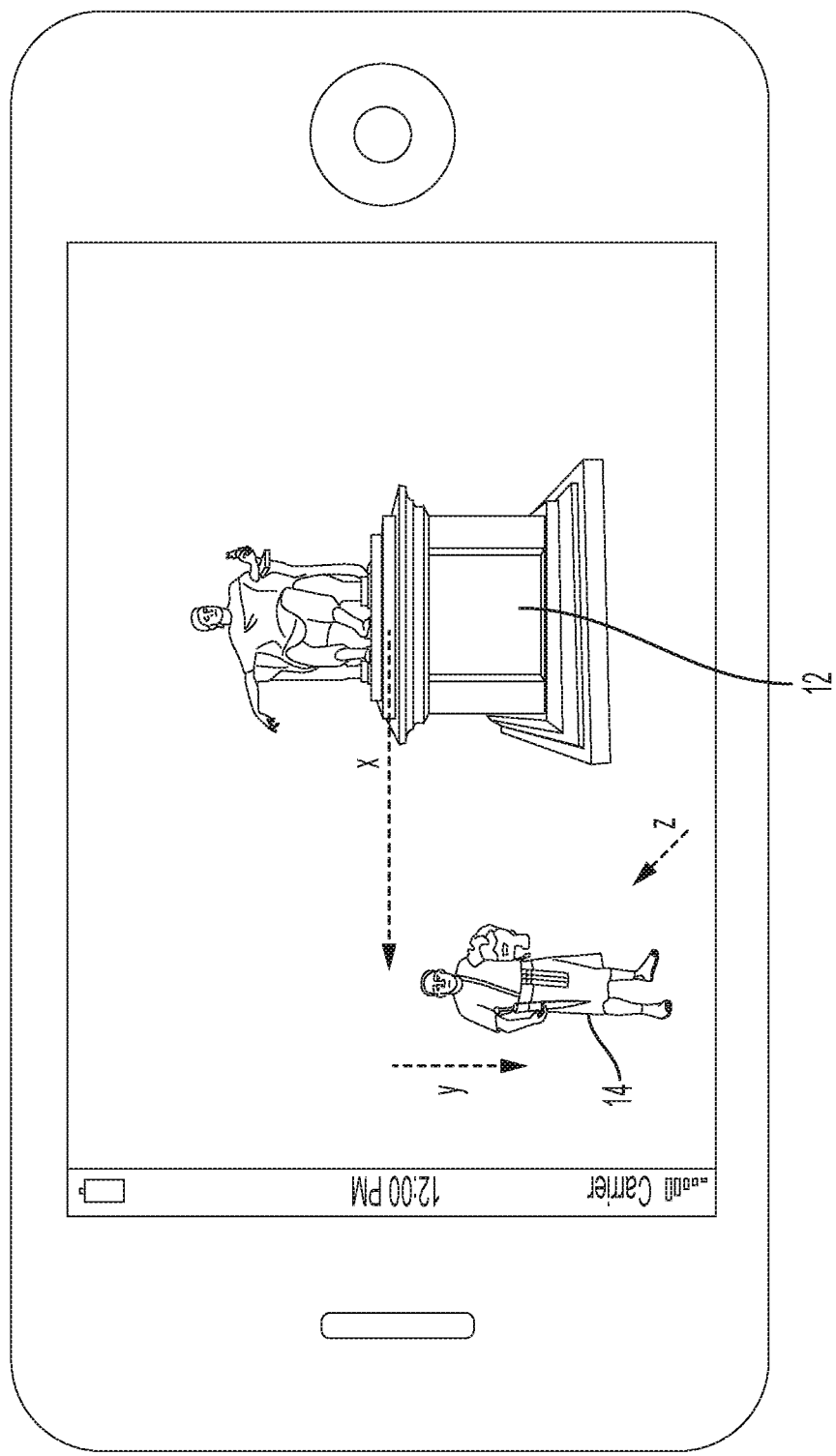
FIG. 5 shows schematically a positioning process.

FIG. 5 shows schematically a technique for positioning the image 14 with respect to the object 12. During creation of a particular app, when the particular scene is first investigated, a creative director will choose an optimum placement for the virtual image, based upon a number of factors, both artistic and practical. Once the optimum position is chosen the system uses trigonometry to compute the position of the image at real world spatial coordinates x, y and z with respect to the object 12. An alternative is to decide upon a zero point within the object and to position the image using absolute x,y and/or z coordinates from the zero point.

Figure 6:
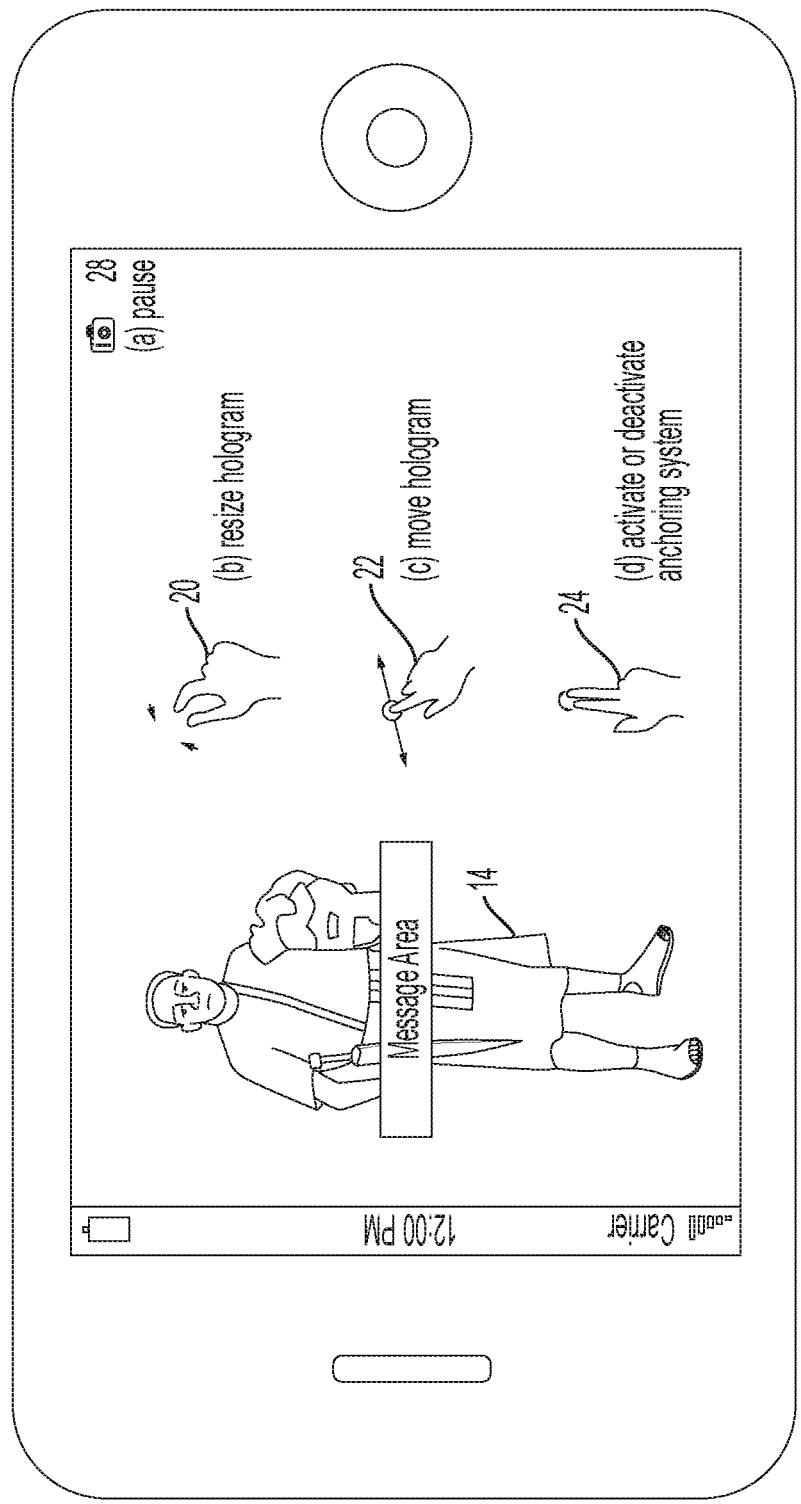
FIG. 6 shows schematically optional user controls for a virtual image.

FIG. 6 shows schematically how the user can re-size or reposition the image with respect to the object. The image can be resized using a finger and thumb pinching and spreading technique 22 whilst touching the screen. The image can be moved using a drag and drop technique 24, and an anchoring system (described below) can also be activated or deactivated by a double finger double tap technique 26. In a PLAY mode, a virtual PAUSE button 28 is also provided, which converts to a virtual PLAY button (not shown) in PAUSE mode.

In order to maintain the illusion that the figure is actually present beside the attraction, it is necessary that the position of the figure—ie the image 14—be spatially anchored with respect to the object 12. This is because if the user moves whilst viewing the object and the virtual image through the camera, an image that is fixed with respect to the camera screen would quickly fail to maintain the illusion of reality.

Figure 7:
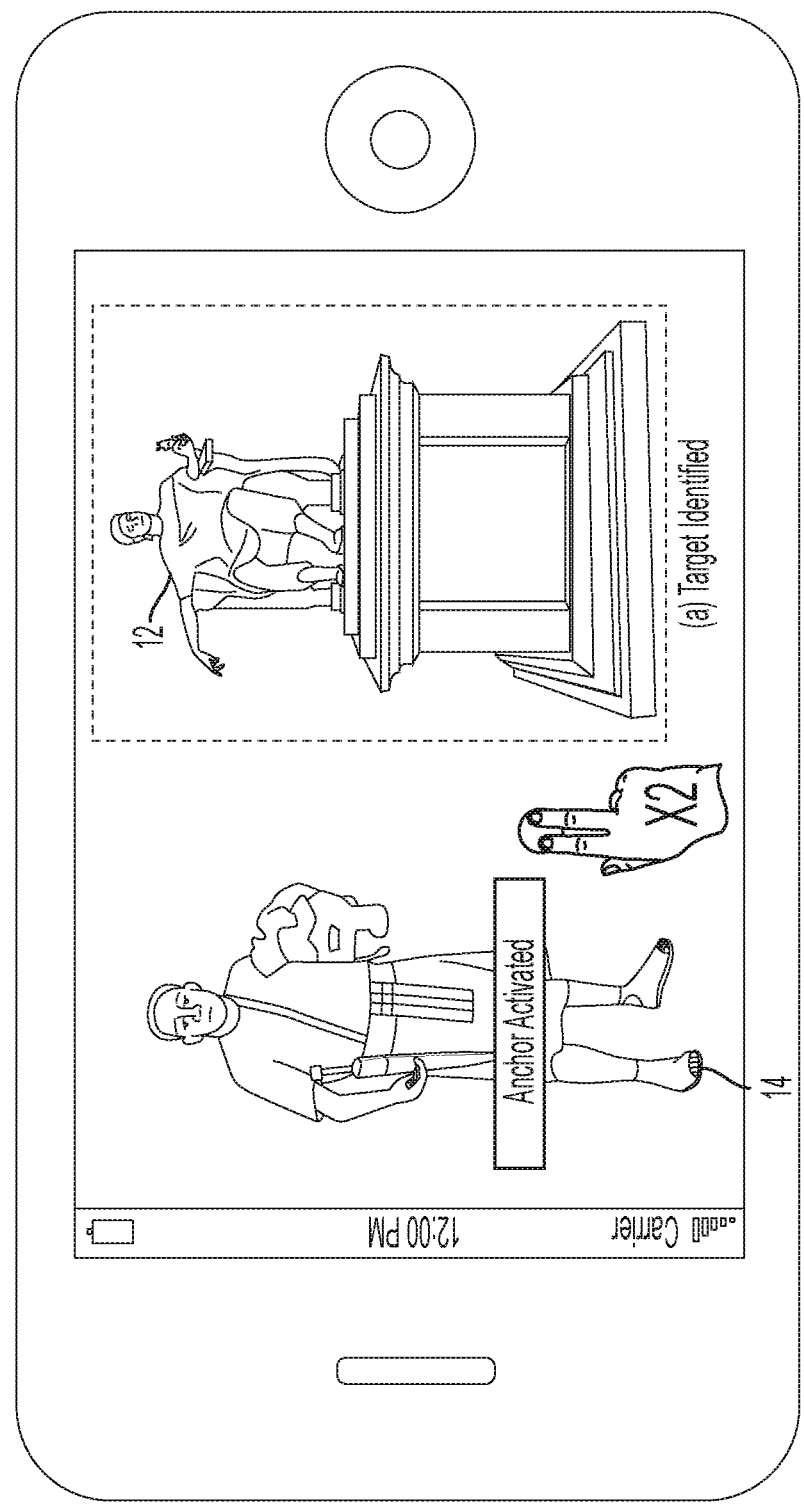
FIG. 7 shows a first step in an anchoring process for the image of FIG. 6.

FIG. 7 shows schematically an anchoring system according to one embodiment of the present invention. The system uses a pre-defined algorithm to seek objects that are either prominent or else have a definitive shape within the camera view. Once several objects have been located the system uses advanced trigonometric techniques to evaluate the scene displayed in the camera view and to allocate proportion data to the virtual image. The system then locks the image in x, y and z coordinates with respect to its real world context.

Figure 8:
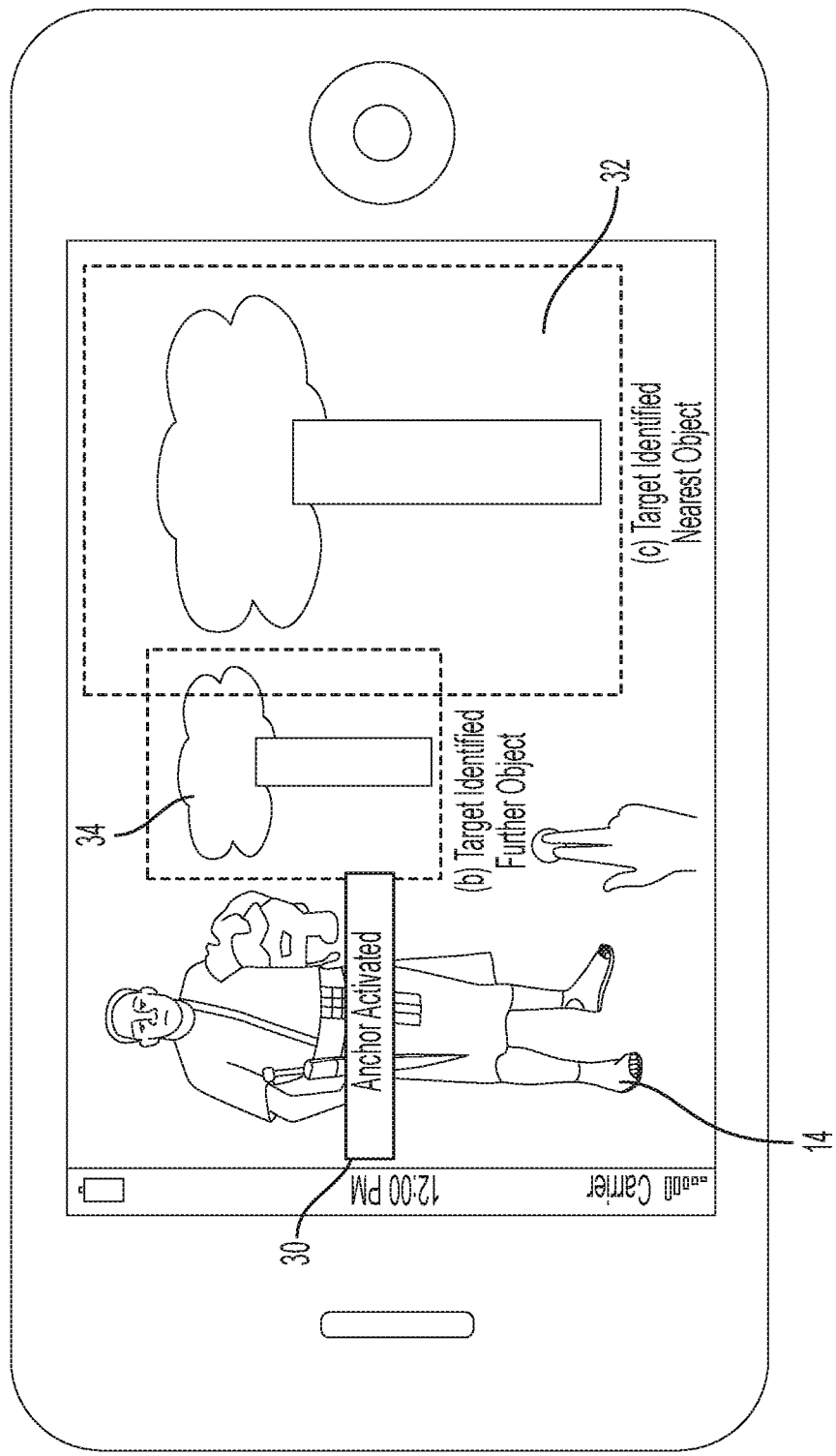
FIG. 8 shows a further step in the anchoring process of FIG. 7.

FIG. 8 shows schematically in more detail the anchoring system according to the above-described embodiment of the present invention. Firstly, a label 30 indicates that the anchor system has been activated. Then the device dynamically detects the nearest object 32 in the camera view. In this case, the method used is one in which an algorithm seeks to recognise objects by detecting a pattern, rather than using pre-processed matrix points (as per the example of FIG. 1). This allows the algorithm to look for real world objects to which the performance—ie the virtual image—can be anchored. For example, the algorithm could recognise the four edges of a snooker table. This allows an improved anchoring technique as recognition rules are created that allow the application of higher or lower thresholds based upon a particular object, or type of object. One suitable previously considered algorithm is known as FAST (Features from Accelerated Segment Test).

A second object 34 is then detected by the device, to provide depth information. The image is then anchored to the first object—ie the position of the image in x, y and z coordinates with respect to the location of the first object 32 is determined. The device then checks regularly to determine whether the object pattern—ie of objects 32 and 34—has changed, which would occur if the user holding the device had moved. If the device determines that there has been movement the device re-scans the field of view and determines the closest match to the initial pattern of objects 32 and 34 to ensure that the position of the virtual image 14 is still true.

The above-described approach allows a user to lock the anchor to a known object within the display, in almost any location, efficiently and invisibly. If there is no specific object from which to take a reference—such as an open field, for example—then the system reverts firstly to a pre-loaded recognition library and then if no view is recognised a digital compass and GPS reference are used to fix the location of the image in real space.

Figure 9:
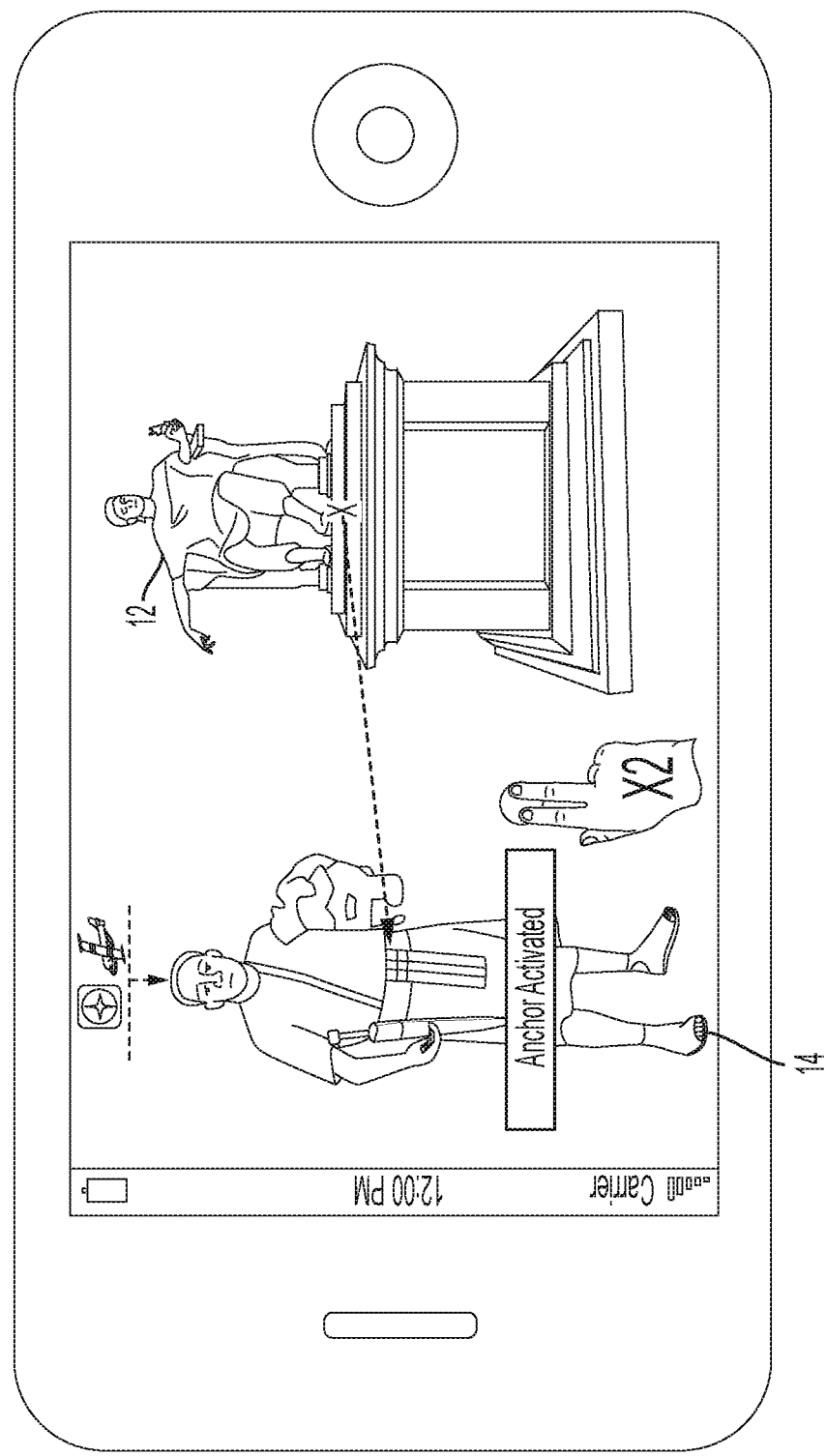
FIG. 9 shows schematically an alternative anchoring process.

The use of GPS and digital compass bearing by the anchoring system is depicted schematically in FIG. 9. This configuration builds a basic real world map by using GPS coordinates alongside compass bearings. The GPS coordinates are used to lock a known longitude and latitude configuration, whilst the bearings are used to detect 360 degree circular movement by the user. If the system detects such a movement then the movie is returned to its original locked position. The animation returns using algorithms that provide a smooth and quick return to the coordinates acknowledging dampening and speed of return based on distance moved.

Figure 10:
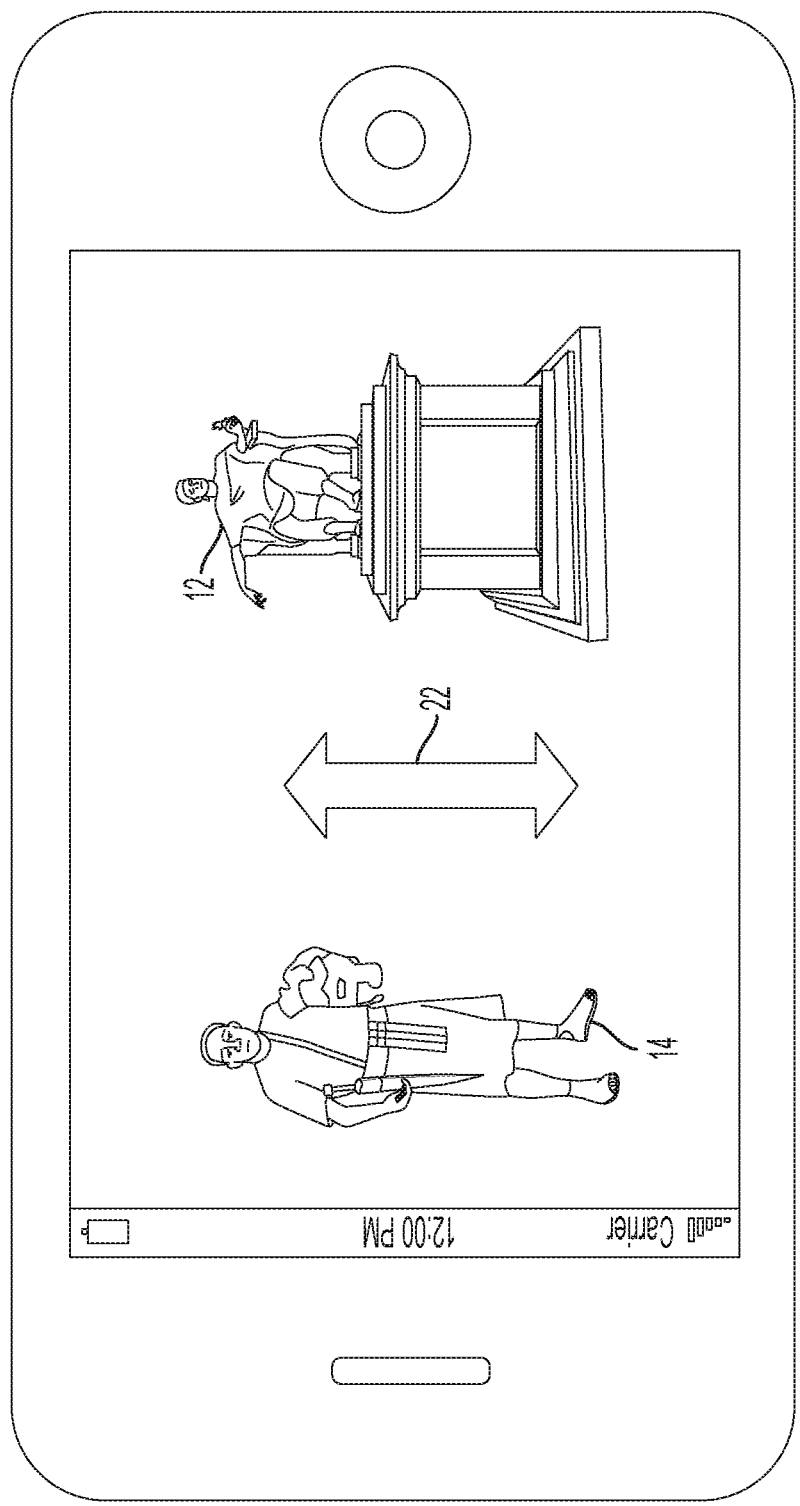
FIG. 10 shows schematically an automatic re-sizing process for a virtual image.

The apparent size of the image with respect to objects in the camera view is also important to maintain the illusion of reality. FIG. 10 shows an automatic sizing operation in which the image 14 is adjusted with respect to the object 12 when a user, viewing the object through the camera device, moves either closer to or further away from the object.

Sophisticated algorithms are employed by the device to adjust the size of the image smoothly as the user moves towards or away from the object 12. The autofocus function of the camera lens may be employed to provide data concerning a change in the distance from the object. If the device does not possess an autofocus function then the distance to the recognised object can be calculated using stored data about its origin. Both techniques can be used, where available, to provide a more accurate reading.

Alternatively, the user can manually re-size the image 14 using the pinch technique 22 described earlier.

Figure 11:
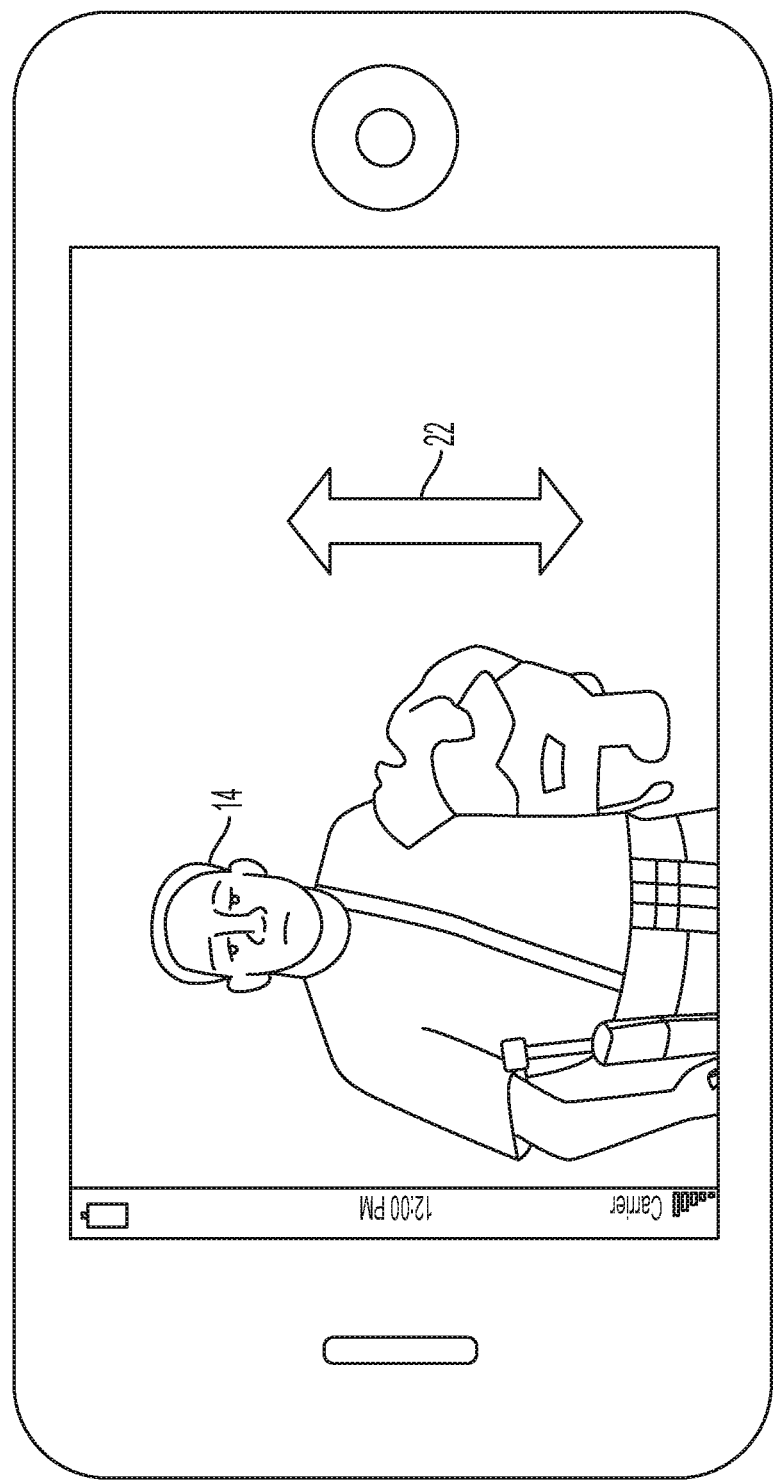
FIG. 11 shows schematically an automatic re-sizing process for a virtual image in an alternative scenario.

If a relatively cramped location is detected by the system, such as an indoor location, or a medieval street scene for example, the device automatically re-sizes the image to a larger size so as to maintain realism. FIG. 11 depicts the enlarged image 14 in such a case.

Figure 12:
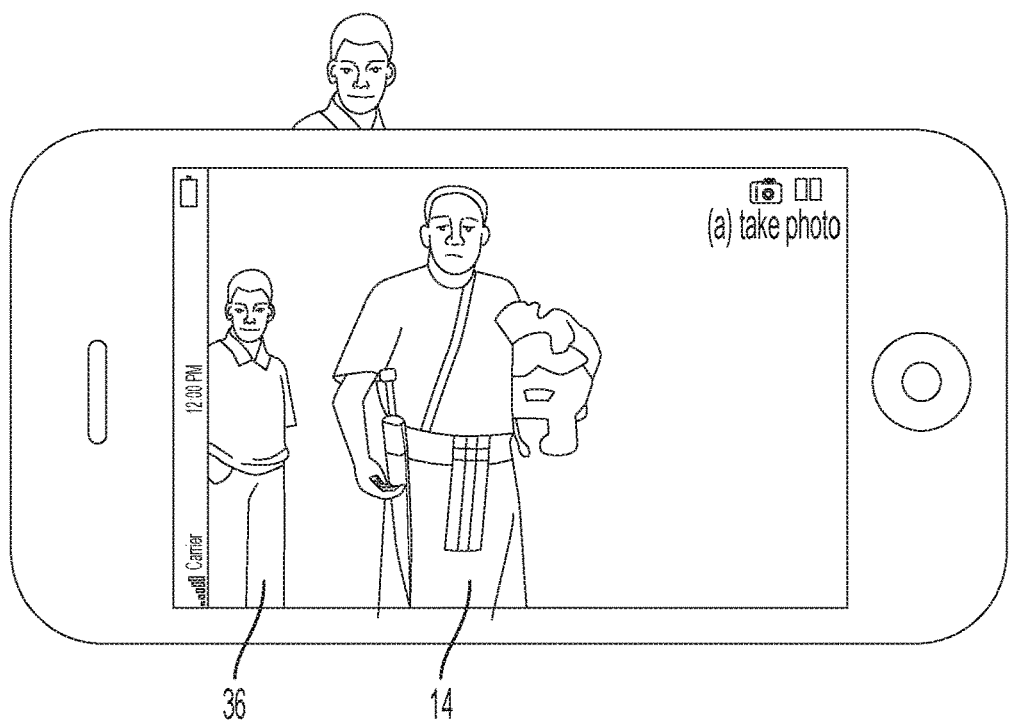
FIGS. 12-15 show schematically different steps in a process for taking a photograph incorporating both a real and a virtual image.
Figures 13, 14:
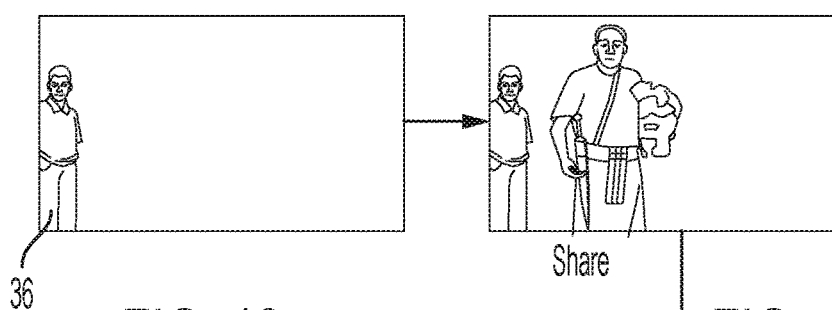
Figure 15:
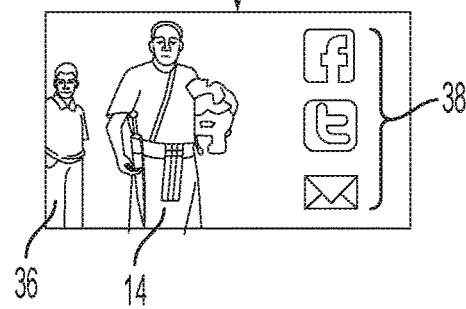

The system also allows the capture of still or video images bearing both the real view and the virtual image. FIGS. 12-15 show schematically a process for taking a photograph with the virtual image 14 included. In FIG. 12 a real person 36 walks into a scene in which the virtual image 14 of the figure is already positioned. In FIG. 13 the photograph is taken and stored and the coordinates of the virtual image are recorded. In FIG. 14 the system post-processes the image 14 and the perspective is auto-detected. The composite image is then re-saved. At FIG. 15 the user is invited to share the stored composite image via virtual buttons 38 accessing several common media. A short video sequence can be recorded and shared in a similar way.

Figure 16:
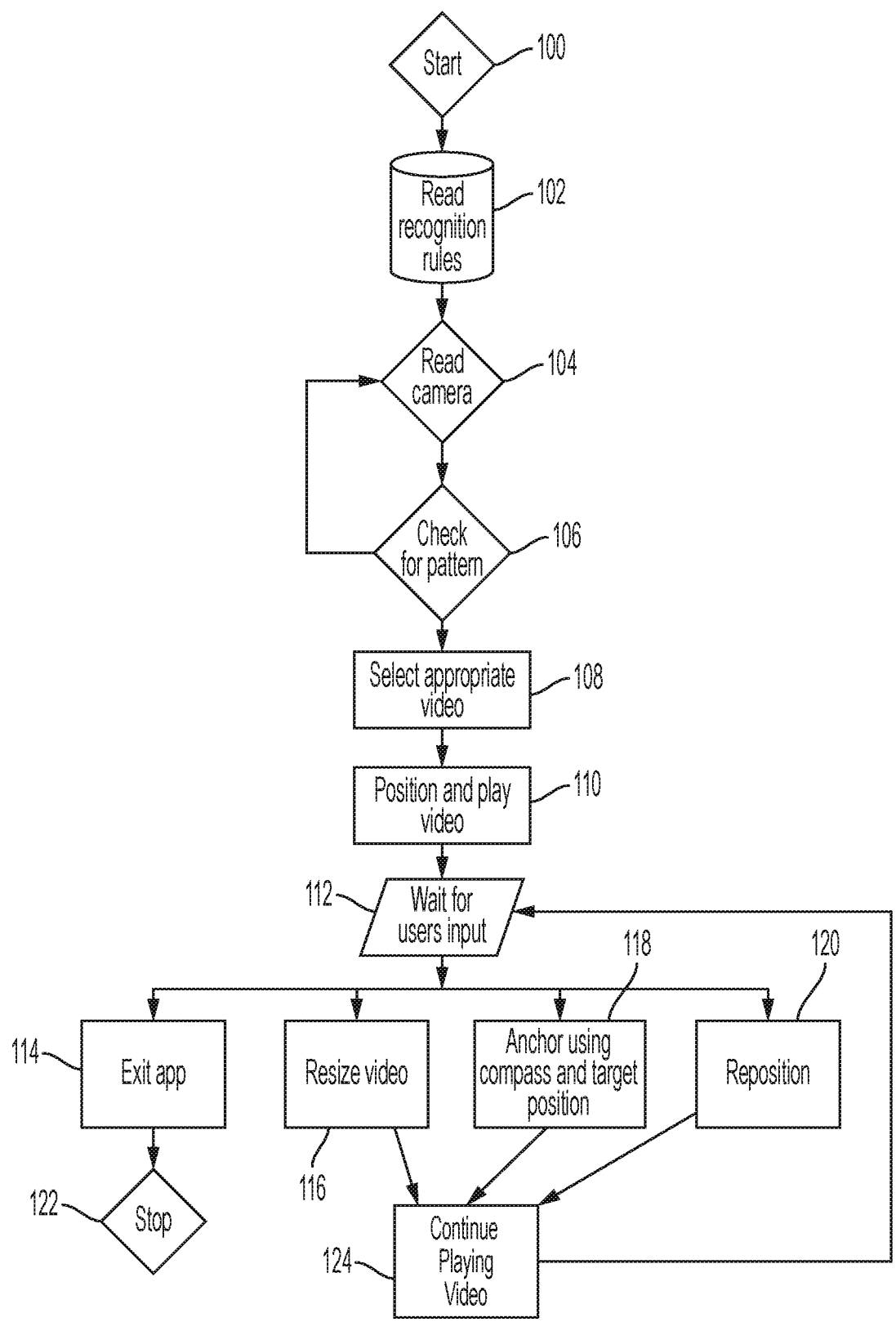
FIG. 16 shows schematically a process for acquiring video footage incorporating both real and virtual images.

FIG. 16 shows schematically an example of a complete process according to the embodiment described above.

At step 100 the process begins. At step 102 object recognition rules are read from a database. At step 104 the device reads the view and at step 106 it checks for a recognisable pattern. The device loops until a pattern is detected. Once a pattern is detected an appropriate moving image is selected from a library at step 108. At step 110 the image is positioned and play begins. Step 112 awaits a user input. Options to exit 114, re-size 116, anchor 118 or reposition 120 are available. If the user selects to exit the app at step 114 the app is stopped at step 122. Otherwise the video image continues to play at step 124.

Figure 17:
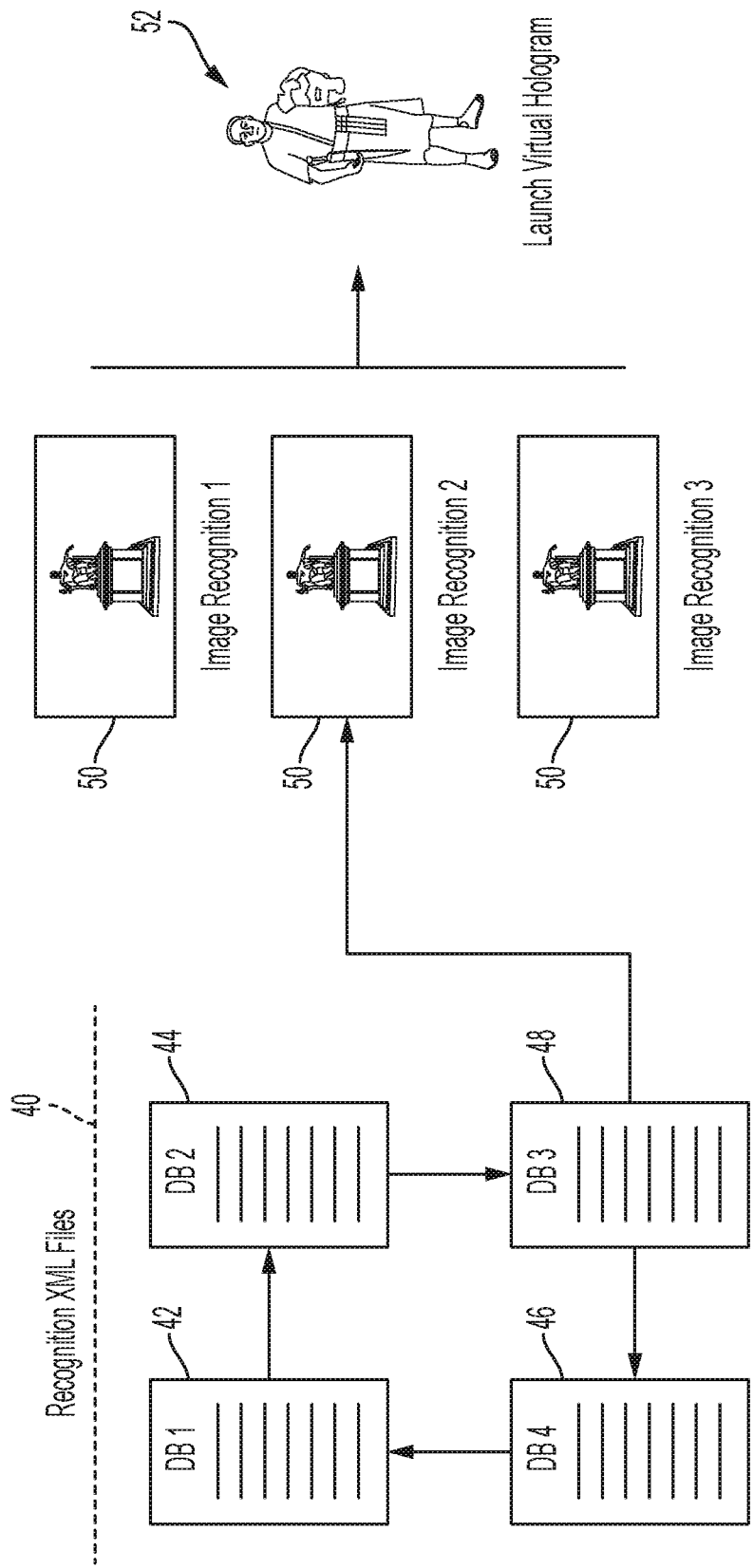
FIG. 17 is a schematic flow diagram showing some key steps in the process of displaying a virtual image in the live view of a camera.

FIG. 17 shows an alternative embodiment in which an object recognition database 40 is split into several smaller databases 42, 44, 46, 48 according to user location. Three or more angles of an object are checked 50 and once the object has been detected the virtual image is launched 52.

The above examples describe using touch controls, which may be different to the ones described. However, where the apparatus supports it, non-contact gestures may be employed to control the device. Similarly, where the apparatus supports it, voice commands may be used to control the apparatus.

The contextual information may be derived from a "real world" image, as viewed through the camera of the device, or may be derived from a two-dimensional image, such as a printed page, photograph or electronically displayed image. This allows the techniques described above to be used to enhance a user experience in a wide variety of circumstances, such as viewing a printed publication or advertisement. In one embodiment (not shown), the virtual image can be made to appear to rise or "pop" up from a such a two dimensional context.

Image processing techniques may be employed to create virtual shadows for the virtual image, so as to enhance the perception that the virtual image is a real one. Similarly, image processing techniques may be employed to balance the apparent brightness of the virtual image relative to the real world context being viewed through the device.

Although the examples described above are of a two-dimensional viewing experience, the techniques described herein may also be applied to an apparent three-dimensional viewing experience where the apparatus supports this, such as in 3-D video playback formats.

In the above description, the term "virtual image" is intended to refer to a previously captured or separately acquired image—which is preferably a moving image—that is displayed on a display of the device whilst the user views the real, or current, or background image or images being captured by the camera of the device. The virtual image is itself a real one, from a different reality, that is effectively cut out from that other reality and transplanted into another one—the one that the viewer sees in the display of his device.

Figure 18:
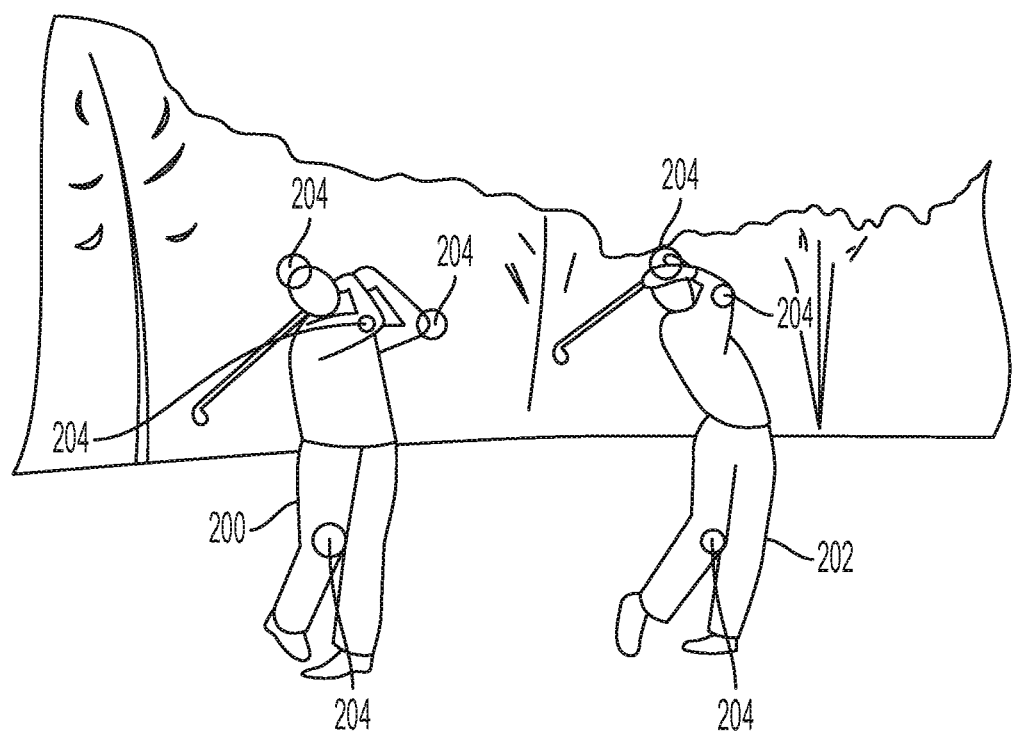
FIG. 18 is a schematic representation of a part of a method of teaching, coaching or demonstrating, according to an embodiment of the present invention.

Turning to FIG. 18 this shows part of a method of teaching, coaching or demonstrating, according to an embodiment of the present invention. An image of a student shown generally at 200—in this case a student of golf—is recorded on a device having a camera and a display, such as a smartphone or tablet. The student performs a task or action, which in the example of FIG. 18 is a golf swing. Then, alongside the recorded image of the student a virtual image 202 as an exemplary or reference demonstration of the task is displayed. This "virtual" image is a pre-recorded image and has been obtained as part of software, e.g in the form of an app. The exemplary image is sized and positioned with respect to the student image according to the techniques described above.

The two moving images are then synchronised, for example by the user utilising a scrubbing technique.

Then the user identifies one or more reference or node points 204 on the student image which correspond with points on the exemplary image.

The software then performs a comparative analysis of the two moving images and, based on the comparison, presents to the user recommendations as to how the action can be improved.

The (virtual) image of the exemplary reference or demonstration can be one that has been downloaded in response to a broadcast, and the downloading can be automatically initiated by the broadcast. Alternatively, the user can select the demonstration from a menu in an app on the user's device.

Figure 19:
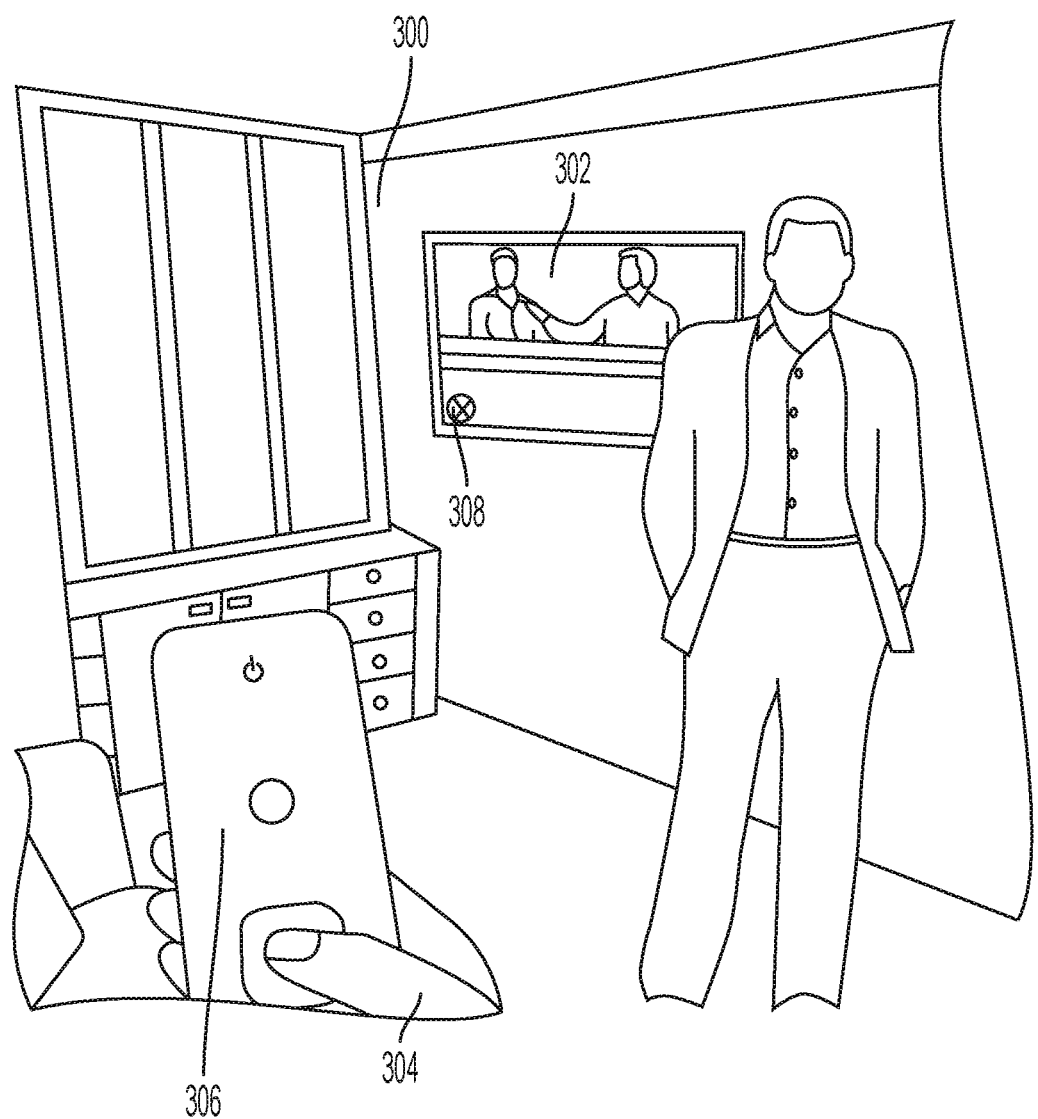
FIG. 19 is a schematic representation of part of a method of augmenting broadcast media content, according to an embodiment of the present invention.

FIG. 19 illustrates schematically a method for providing augmented content for broadcast media. FIG. 19 shows a room 300 including a television 302, as viewed on a display of a hand held device, such as a tablet (not shown) whilst the image of the room is captured by a camera of the device. The device has stored on it an app which is used to access additional content. A user's hand 304 is depicted operating a remote control unit 306 of the television 302.

A symbol 308 is displayed on the television screen and this indicates to the user's device that additional content is available. The trigger for accessing the additional content can take any of a number of forms, including for example visual or audio. If it is an audio trigger it may be of a frequency that, whilst detectable by the user device, or an app stored on it, is substantially inaudible to the user.

In this example the additional content is a moving image of a person 310 which is sized and positioned, using techniques described above, so as to give the appearance of being in the room. The "virtual" image of the person 310 is arranged to provide viewable video content that supplements or complements the content being broadcast. The additional content may be downloaded or streamed from the internet and may be synchronised with the broadcast content.

The additional content may be optimised for viewing alongside the broadcast medium, or may be intended for viewing at an alternative location and/or at a later time.

The access to the additional content may be reached by an interactive engagement of the user with the broadcast medium, such as by pressing the interactive button on the remote control 306.

Figure 20:
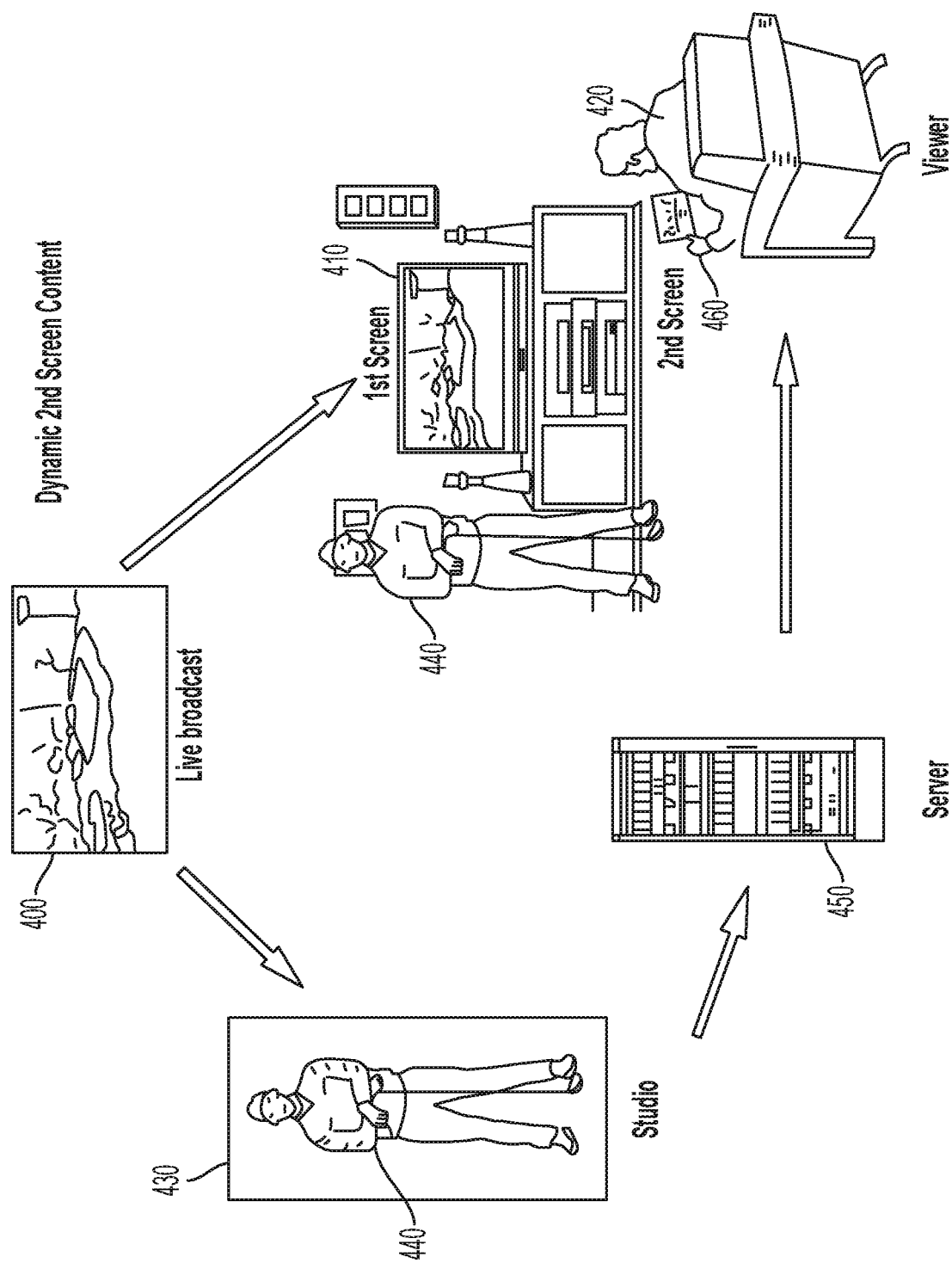
FIG. 20 shows schematically an example of the delivery of additional content to a user.

FIG. 20 shows schematically alternative modes by which additional content may be delivered to a user. At 400 a live broadcast is depicted, in this case a golf tournament. The broadcast 400 is depicted on a television screen 410 of a user 420, substantially in real time. In a television studio, represented by 430, which may be close to the site of the live broadcast, or may be remote therefrom, a commentator or pundit 440 records segments of video analysis. The video image is sent to a server 450. The video clip of the commentator 440 is then downloadable by the user 420 using a device such as a mobile phone or tablet 460. The user can then view the additional content—the video segment of the commentator 440—on his device 460. Using the techniques of positioning and anchoring as described above, the user 420 can enjoy the video segment 440 as though the commentator were present in the room, by viewing the room through a camera of the device 460.

The additional content can also include other segments or portions of video, or other relevant images, that have been pre-recorded and stored on the server.

In an alternative embodiment (not shown), the user can download the background as well as the additional content. For example the user may download a background comprising a famous venue. The user may also receive a background image recorded by another user.

Figure 21:
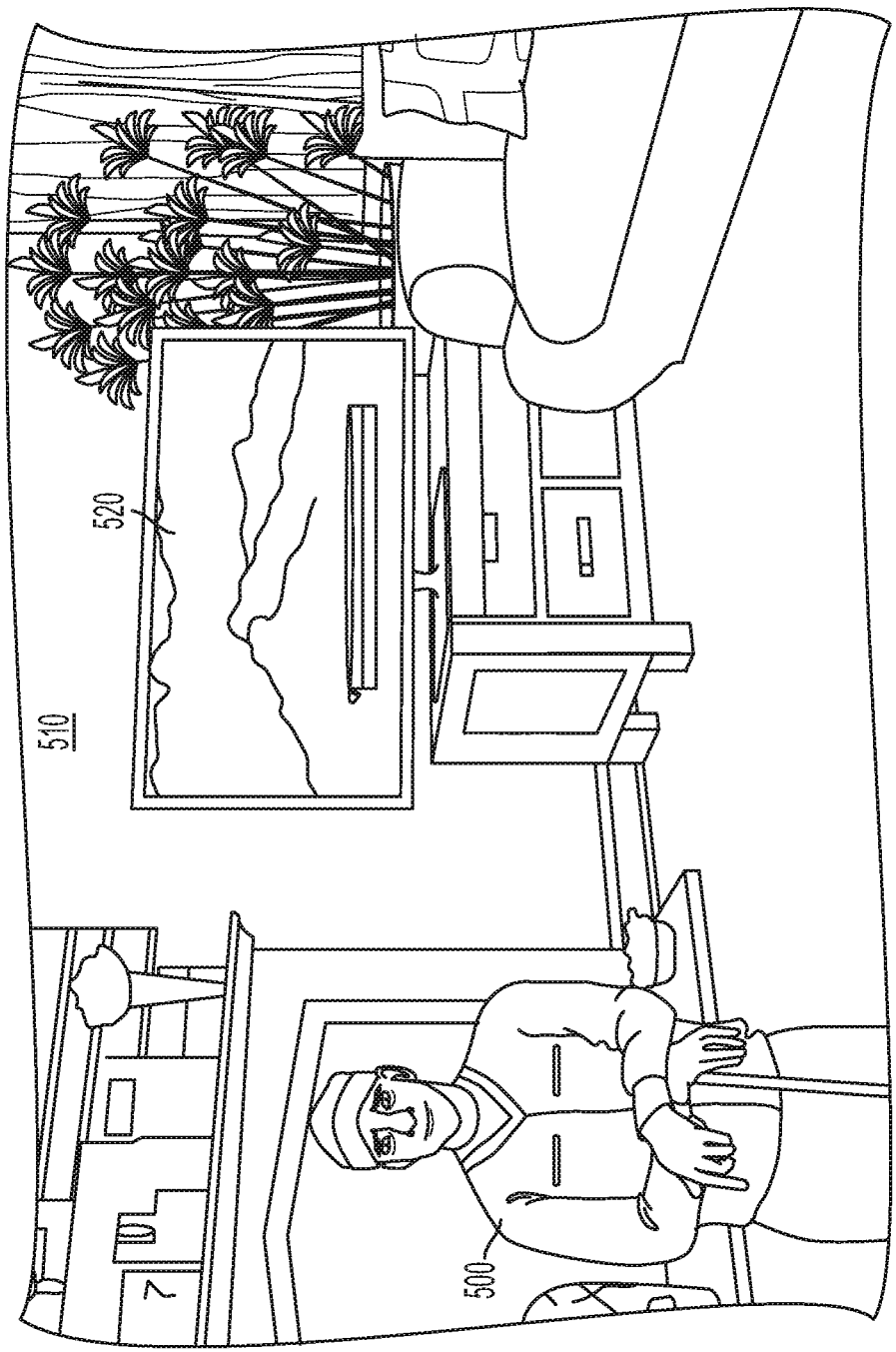
FIG. 21 shows schematically additional content viewed against a pre-recorded background.

FIG. 21 shows schematically an alternative embodiment of the present invention, in which a user (not shown) views additional content 500, in this case a video segment of a golfing expert, against a still image of his room 510, previously captured by a camera, which may be the camera of the device (not shown) on which the user is viewing the additional content.

To do this, the user follows instructions on an app which tell him how to position the camera to take a suitable image of a room 510 in which a television screen 520 is placed. The app is able to detect from the image the position of the television set, or else the user is required to designate its position, for example by identifying coordinates of the corners of the television.

The user can then watch the screen of his device whilst enjoying a video segment of additional content. The video segment of the additional content 500, in the form of the commentator, is positioned and may be anchored, with respect to the image of the room, or one or more elements therein. The user may also watch a television broadcast superimposed on the image of the television screen in the captured still image of the room. The user may increase the size of the broadcast image by interacting with the device, for example by making a tapping gesture.

This arrangement allows for a user to watch a broadcast in his "real" environment whilst being able to glance at his hand held device to receive the additional content. In this embodiment there is no need for the user to view the broadcast through the camera of a hand held device.

The hand held device may be arranged to switch between a live view of the room, through its camera, and a pre-recorded view. The additional content will be available in either configuration. The device may switch according to its attitude, so that if the device is held upright the live view is selected, and if the device is tilted away from upright the pre-recorded view is selected. The switching may be automatic according to a sensed attitude.

When the additional content is viewed against the pre-recorded image, the broadcast may be superimposed on the television 520 of the user—ie the one depicted in the image of the room. Alternatively, the television set 520 may be replaced by an image of a screen, such as a television (not shown) provided by a sponsor, such as the latest model on offer.

Figure 22:
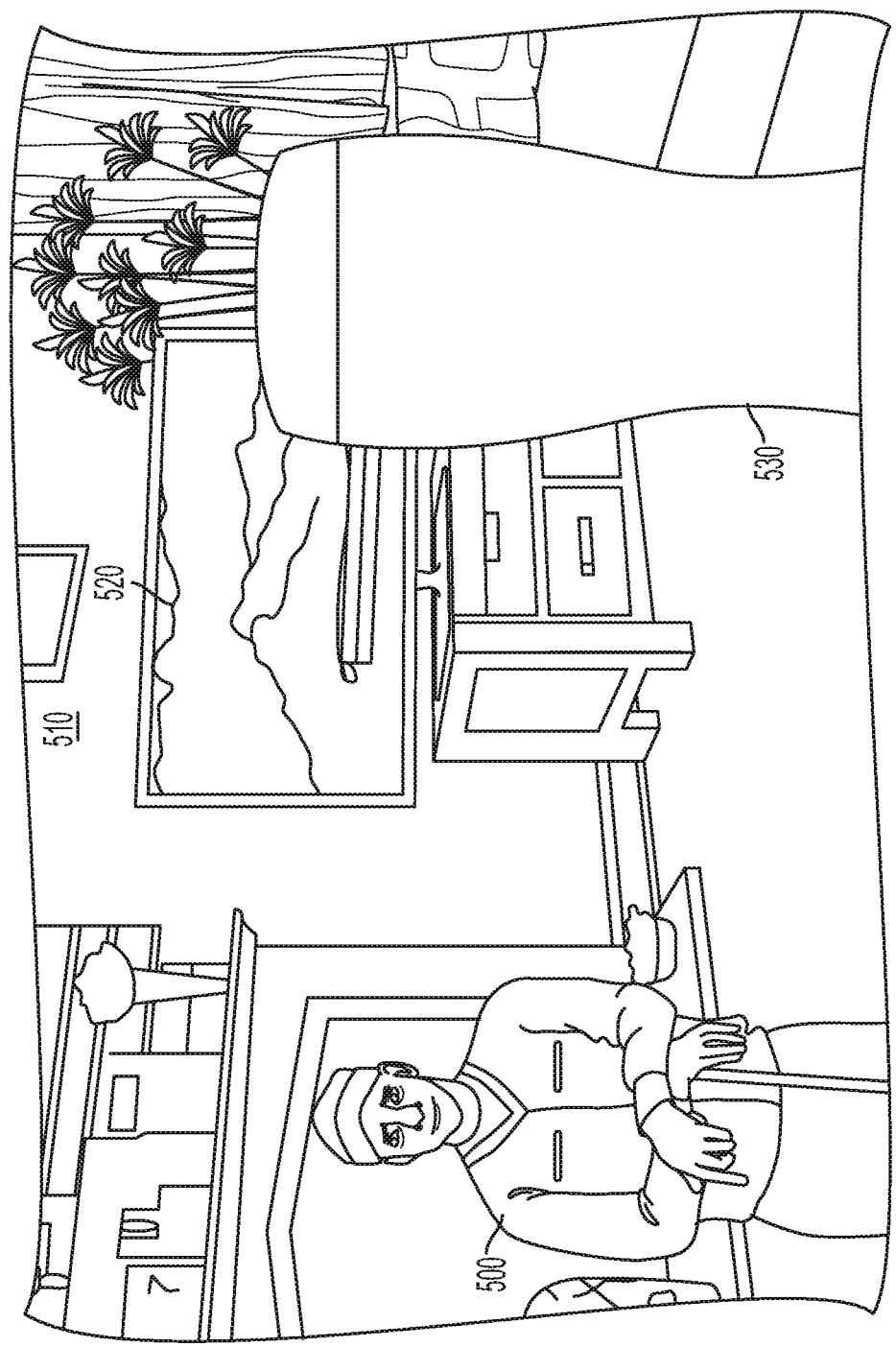
FIG. 22 shows the additional content and background of FIG. 21, with further additional content.

Additional imagery may be provided as part of the additional content. Turning to FIG. 22, this shows the room 519 with a commercial image 530 is depicted. This image, of a commercially available brand of drink, may be provided whether the image of room is being viewed "live" or else whether the pre-recorded image of the room is being used. In either case, using the techniques described earlier, the image 530 may be appropriately positioned, sized and anchored within the room, preferably in order to maximise the commercial opportunity to the sponsor/advertiser.

Figure 23:
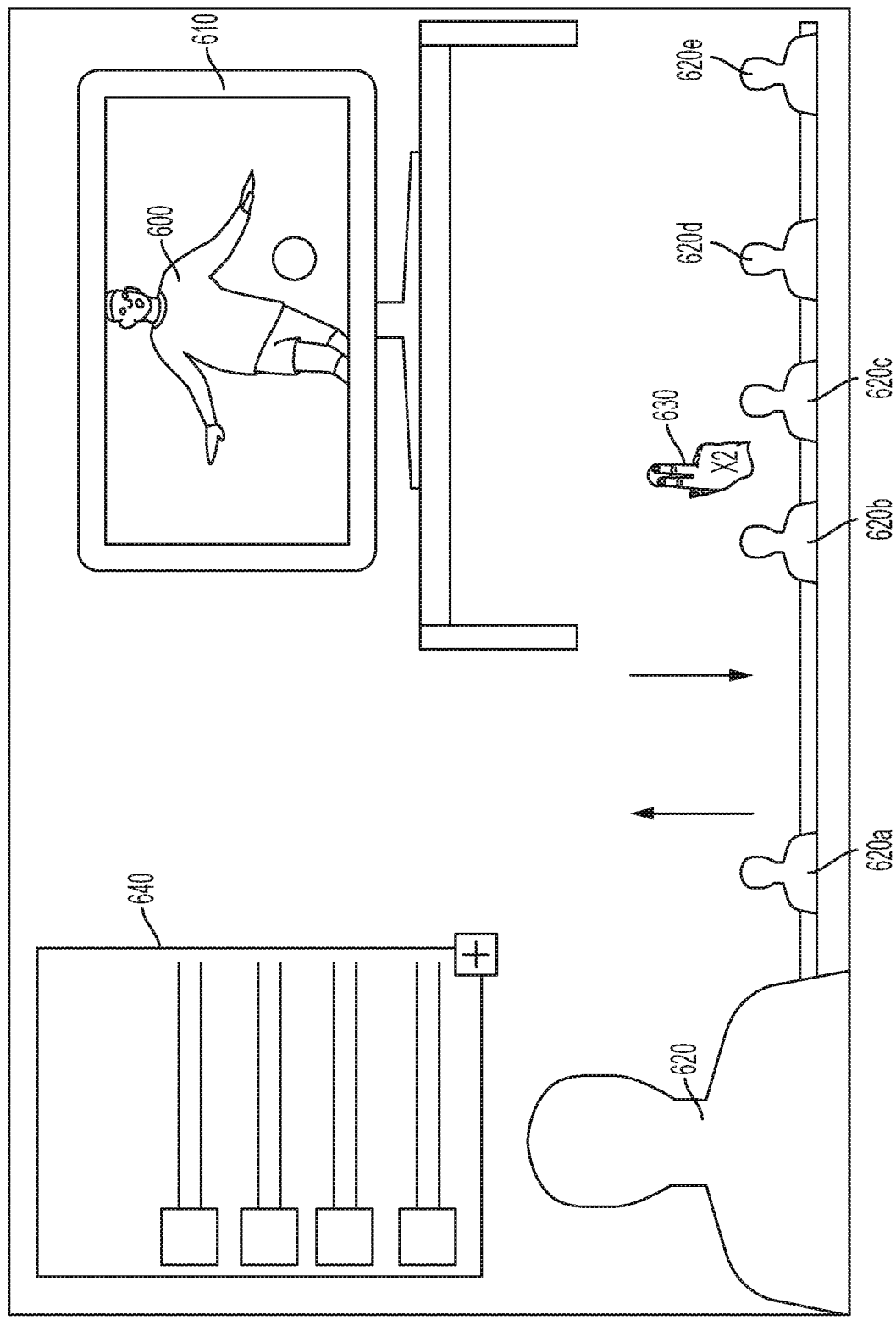
FIG. 23 shows schematically the interaction of a viewer of the additional content with a social message platform.

FIG. 23 shows schematically another embodiment of the present invention. A user (not shown) watches a broadcast 600 on a screen, such as a television screen 610. During the broadcast the user has options to access several segments of additional content, represented at 620. The additional content is selected and accessed by the a user interaction, such as strokes of the fingers on a touch screen, represented by arrows 620. When selected, one of the additional content segments 620a-e plays at 620.

In addition, with another user gesture, such as a double tap represented by 630, a user can access a social media platform interface 640 so that he may engage with other people watching the broadcast. A further option of accessing a knowledge base (not shown), which may be related to the broadcast or to the additional content for example, either to be downloaded or streamed, may be initiated by a further user action.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

What is claimed is:

1. A method of delivering augmented content for a broadcast medium,
the method comprising providing additional viewable content in the form of a virtual image of a real world object or person to a user device having a camera and a display, for viewing on the display of the user device, identifying a context from a background image captured by a live camera view of the user device and positioning and spatially anchoring the virtual image to the context identified in the live camera view, such that the virtual image follows any apparent movement of the context in the live camera view, and further includes sizing the virtual image with respect to the context identified in the live camera view, thereby creating an illusion that the virtual image is present in the field of view of the camera in real time, wherein the broadcast medium has a trigger sign that is recognizable by the user device, and the user device is arranged to display the additional viewable content upon recognition of the trigger sign, and wherein the method includes accessing the additional viewable content by interactive engagement with the broadcast medium.

2. The method according to claim 1, wherein the image captured by the camera is a live background image captured substantially in real time as the additional viewable content is viewed.

3. The method according to claim 1, wherein the method includes recording an image captured by the camera and viewing the additional viewable content with the recorded image as a background image.

4. The method according to claim 3, wherein the background image comprises a still image.

5. The method according to claim 1, wherein the trigger sign comprises at least one of a visual sign and an audio sign.

6. The method according to claim 1, wherein when the trigger sign comprises an audio signal that is substantially inaudible to a viewer of a broadcast.

7. The method according to claim 1, wherein the trigger sign is detectable by an app stored on the user device.

8. The method according to claim 1, wherein the trigger sign, or a part thereof, is arranged to serve as a signal for synchronization of the additional viewable content with a broadcast.

9. The method according to claim 1, wherein the additional viewable content is pre-recorded in advance of a broadcast.

10. The method according to claim 1, wherein the additional viewable content comprises a recording made during a broadcast for substantially immediate viewing.

11. The method according to claim 1, wherein the additional content comprises an image delivered substantially contemporaneously with a broadcast.

12. The method according to claim 1, wherein the method includes accessing the additional content by interacting with the broadcast medium.

13. An apparatus for displaying augmented viewable content for a broadcast medium, the apparatus comprising a user device having a camera and a display, a context identification unit for identifying a context from a background image captured by a live camera view of the user device, a retrieval unit for selecting and displaying an additional viewable content in the form of a virtual image of a real world object or person, and a virtual image positioning unit for positioning, spatially anchoring and sizing the virtual image to the context identified in the live camera view, such that the virtual image follows any apparent movement of the context in the live camera view, thereby creating an illusion that the virtual image is present in the field of view of the camera in real time, wherein the broadcast medium has a trigger sign that is recognizable by the user device, and the user device is arranged to display the additional viewable content upon recognition of the trigger sign, and wherein the additional viewable content is accessed by interactive engagement of the user with the broadcast medium.

14. The apparatus according to claim 13, wherein the additional viewable content is in the form of a moving video image.

15. The apparatus according to claim 13, wherein the user device has a camera that is arranged in use to capture a live background image substantially in real time as the additional viewable content is viewed.

16. The apparatus according to claim 13, wherein the user device has a camera that is arranged to capture and record a background image for subsequent viewing of the additional viewable content with the recorded background image as a background.

17. The apparatus according to claim 13, wherein the user device is arranged in use to display a live background image when the device is in a first orientation, and to display a pre-recorded background image when the device is in a second orientation.

18. The apparatus according to claim 17, wherein the device is arranged in use to switch automatically between the live and the pre-recorded background images according to a user action.

* * * * *